US010648795B2

(12) United States Patent
Ushijima

(10) Patent No.: US 10,648,795 B2
(45) Date of Patent: May 12, 2020

(54) DISTANCE MEASURING APPARATUS AND DISTANCE MEASURING METHOD

(71) Applicant: FUJITSU LIMITED, Kawasaki-shi, Kanagawa (JP)

(72) Inventor: Satoru Ushijima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 298 days.

(21) Appl. No.: 15/700,346

(22) Filed: Sep. 11, 2017

(65) Prior Publication Data

US 2018/0106598 A1 Apr. 19, 2018

(30) Foreign Application Priority Data

Oct. 14, 2016 (JP) ................................. 2016-202719

(51) Int. Cl.
*G01C 3/08* (2006.01)
*G01B 11/14* (2006.01)
(Continued)

(52) U.S. Cl.
CPC ............... *G01B 11/14* (2013.01); *G01C 3/08* (2013.01); *G01S 7/4802* (2013.01); *G01S 7/4808* (2013.01); *G01S 7/4876* (2013.01); *G01S 17/06* (2013.01); *G01S 17/42* (2013.01); *G01S 17/89* (2013.01)

(58) Field of Classification Search
None
See application file for complete search history.

(56) References Cited

U.S. PATENT DOCUMENTS

| 2012/0263353 | A1* | 10/2012 | Kitajima | G01S 7/4802 382/106 |
| 2016/0040979 | A1* | 2/2016 | Takiguchi | G01S 17/42 356/614 |
| 2018/0172830 | A1* | 6/2018 | Watanabe | G06T 7/13 |

FOREIGN PATENT DOCUMENTS

| GB | 2528810 A | | 2/2016 |
| JP | 2001014474 A | * | 1/2001 |

(Continued)

OTHER PUBLICATIONS

Extended European Search Report dated Mar. 1, 2018 for corresponding European Patent Application No. 17190812.2, 8 pages.

*Primary Examiner* — Isam A Alsomiri
*Assistant Examiner* — Amir J Askarian
(74) *Attorney, Agent, or Firm* — Fujitsu Patent Center

(57) ABSTRACT

A distance measuring apparatus measures a distance to a target based on reflected light in response to launched laser beam. A distance measuring process includes generating a difference binary image from first and second range images that are respectively generated in states without and with the target in front of a background and represent distances to each of range measurement points, extracting a first region greater than a first threshold from a non-background region of the difference binary image made up of non-background points, grouping adjacent points on the second range image into groups of adjacent points having close distance values, for each point within the first region, to extract second regions corresponding to the groups, and extracting a third region smaller than a second threshold from the second regions, to judge that each point within the third region is edge noise.

20 Claims, 20 Drawing Sheets

(51) Int. Cl.
*G01S 7/48* (2006.01)
*G01S 17/42* (2006.01)
*G01S 17/89* (2020.01)
*G01S 7/487* (2006.01)
*G01S 17/06* (2006.01)

(56) References Cited

FOREIGN PATENT DOCUMENTS

| | | |
|---|---|---|
| JP | 2005-242488 | 9/2005 |
| JP | 2014-035302 | 2/2014 |
| JP | 2014137762 A * | 7/2014 |

* cited by examiner

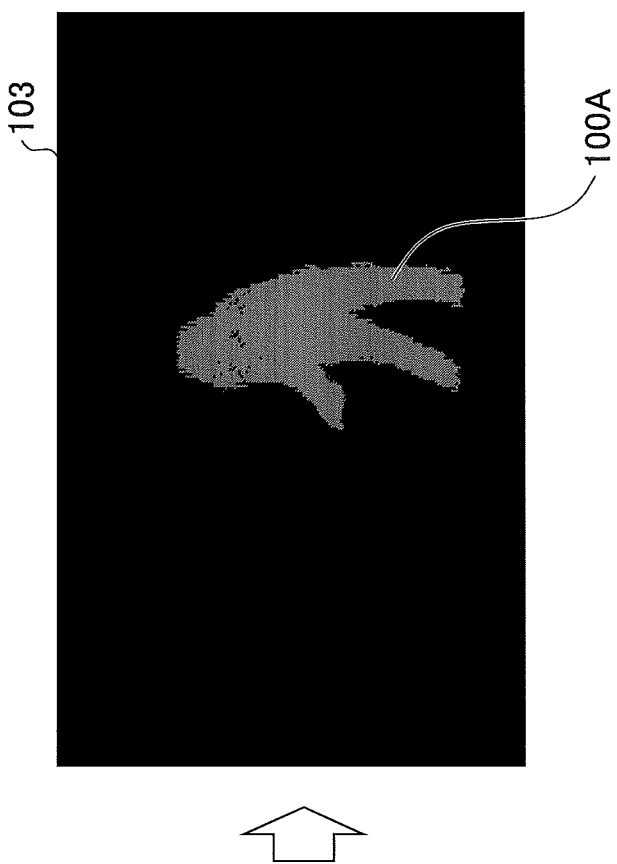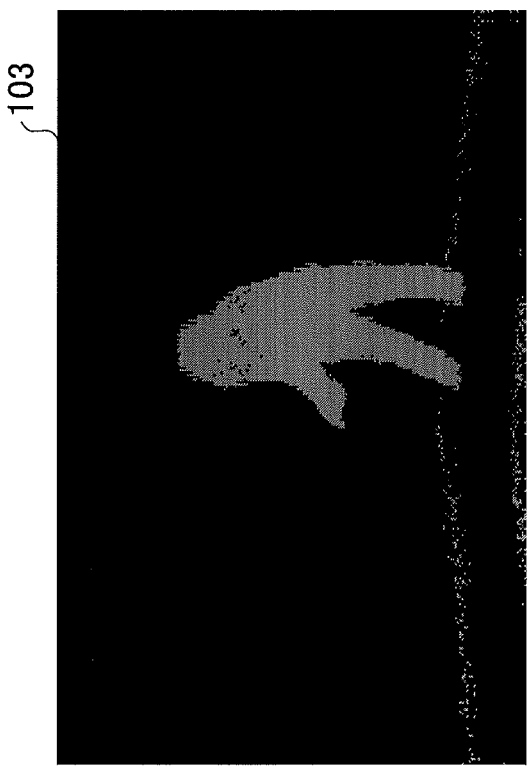
FIG.5

FIG.6
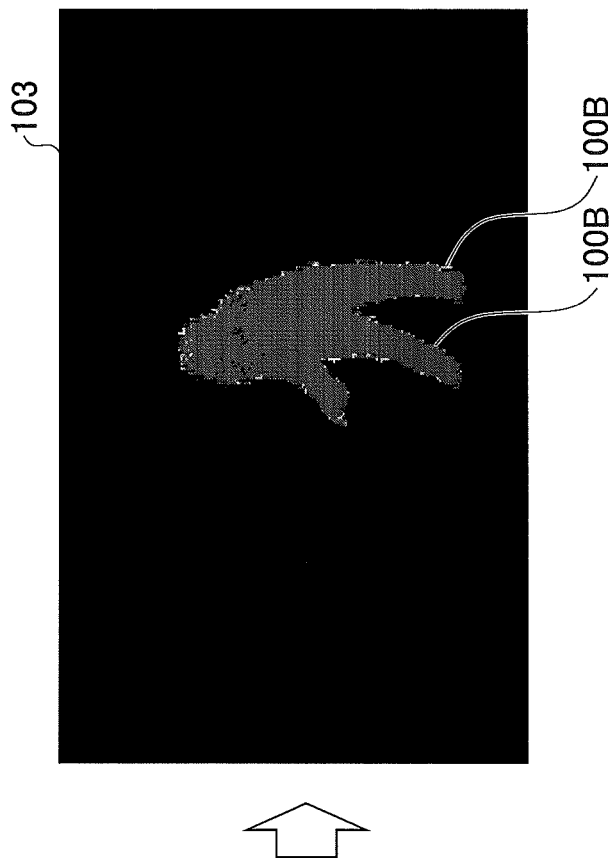
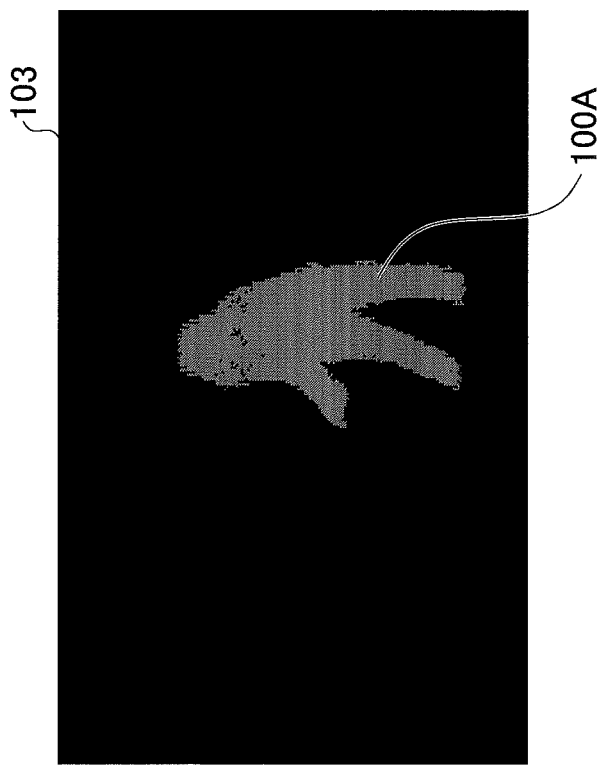

| 7 | 0 | 1 |
|---|---|---|
| 6 | ■ | 2 |
| 5 | 4 | 3 |

FIG.20
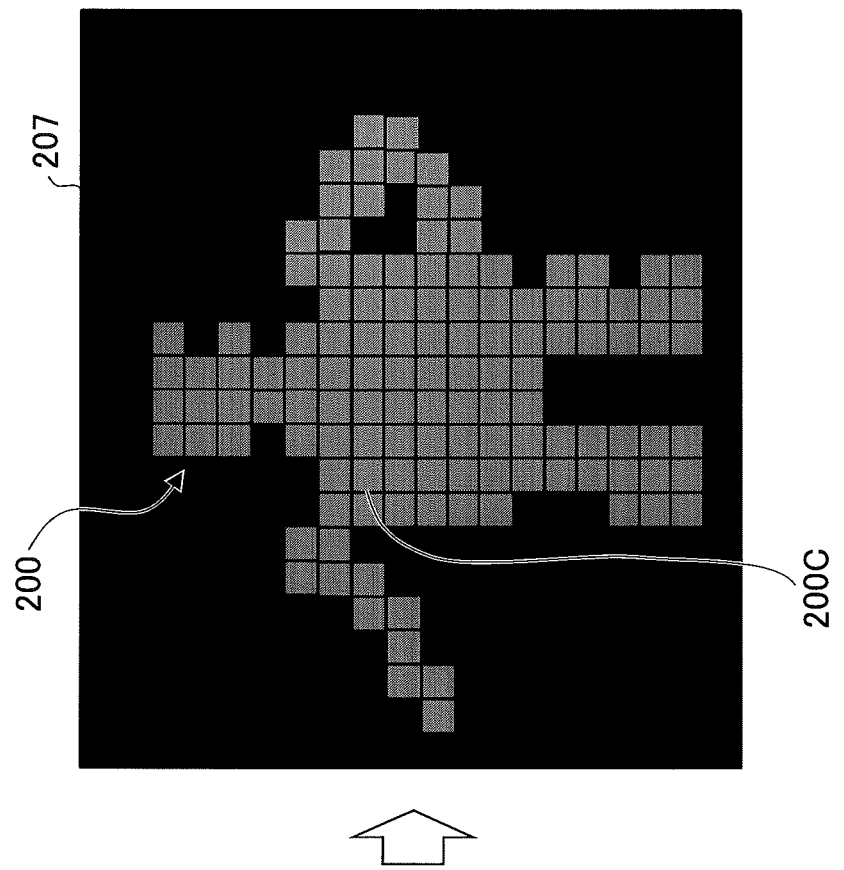
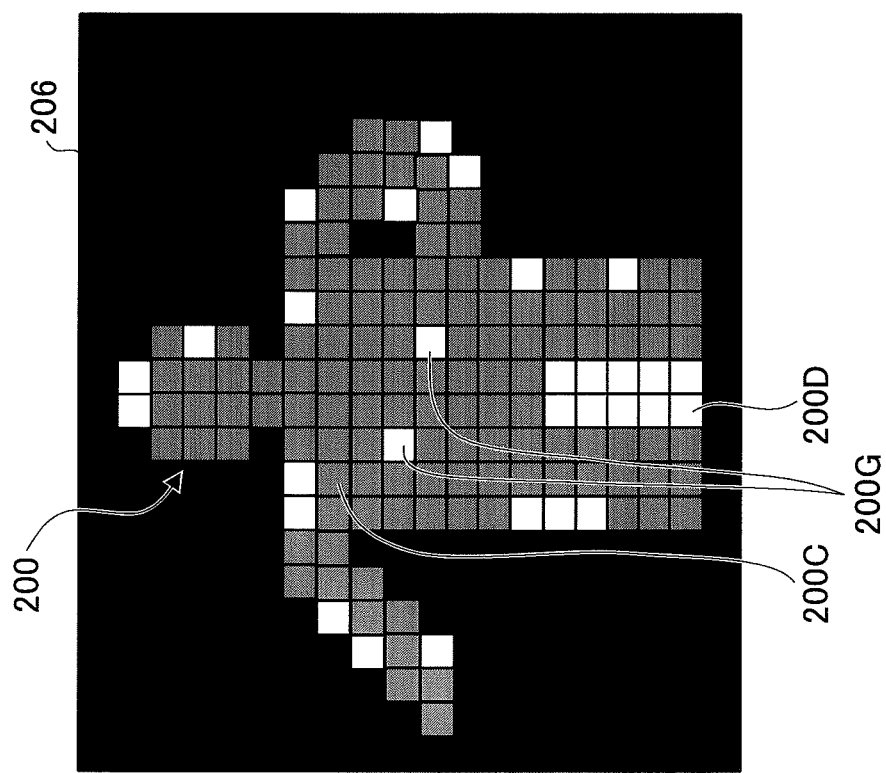

ized by means of the elements and combinations particularly pointed out in the claims.

DISTANCE MEASURING APPARATUS AND DISTANCE MEASURING METHOD

CROSS-REFERENCE TO RELATED APPLICATIONS

This application is based upon and claims the benefit of priority of the prior Japanese Patent Application No. 2016-202719, filed on Oct. 14, 2016, the entire contents of which are incorporated herein by reference.

FIELD

The embodiments discussed herein are related to a distance measuring apparatus, a distance measuring method, and a computer-readable storage medium.

BACKGROUND

A distance measuring apparatus that uses a laser beam launches the laser beam in the form of pulses (hereinafter referred to as a "pulse laser beam"), and detects the laser beam reflected from a target. A distance to the target is measured from a TOF (Time Of Flight) ΔT of the laser beam that is launched from the distance measuring apparatus, reflected by the target, and returned and received by the distance measuring apparatus. When a velocity c of light is regarded to be approximately 300,000 km/s, the distance to the target can be obtained from (c×ΔT)/2, for example.

A measured result of the distance measuring apparatus may in some cases be output in the form of a range image (or depth map) in which distance values at each of range (or distance) measurement points are arranged in an order of the raster scanned samples, for example. The range image may represent the distances to the range measurement points by pixels having colors according to the distances. In the range image representing the distances to each of the range measurement points, it is possible to measure an accurate TOF value at an inner part or the like of the target, because the entire laser beam hits the target and is reflected by the target.

On the other hand, in the range image representing the distances to each of the range measurement points, a contour part of the target corresponds to a boundary part between the target and a background. At the boundary part, only a portion of the laser beam hits the target and is reflected by the target. For this reason, compared to the case in which the entire laser beam hits and is reflected by the target, an amount of the laser beam reflected from the boundary part is smaller, and a rise in an output signal waveform of a photodetector that detects the laser beam is more gradual. In addition, an amplitude of the output signal waveform of the photodetector that detects the laser beam reflected by the boundary part is lower compared to the case in which the entire laser beam hits and is reflected by the target, and a timing when the amplitude of the photodetector output exceeds a threshold value for judging the time when the laser beam reaches the target is delayed. Furthermore, compared to the case in which the entire laser beam hits and is reflected by the target, the measured TOF value becomes larger by an amount corresponding to the delay in the amplitude of the photodetector output exceeding the threshold value. For these reasons, the TOF value that is measured by detecting the laser beam reflected from the boundary part of the target becomes larger than the TOF value representing the actual distance from the boundary part. In this case, when the range image representing the distances to each of the range measurement points is generated based on the measured TOF values, a group of pixels generated from the TOF values corresponding to the boundary part of the target appear as noise. On the other hand, it is impossible to distinguish, simply from the magnitudes of the TOF values, whether the output signal waveform of the photodetector represents the distance to the target or the distance from the boundary part of the target.

In this specification, in the range image representing the distances to each of the range measurement points, the noise caused by the boundary part of the target is referred to as "edge noise". When a three-dimensional image of the target is generated based on the range image representing the distances to each of the range measurement points, for example, the edge noise appears behind the target in the three-dimensional image.

According to the conventional distance measuring apparatus, it is impossible to distinguish whether the output signal waveform of the photodetector represents the distance to the target or the distance from the boundary part of the target. Consequently, it is difficult to detect the edge noise from the range image representing the distances to each of the range measurement points.

Related art includes Japanese Laid-Open Patent Publications No. 2005-242488 and No. 2014-035302, for example.

SUMMARY

Accordingly, it is an object in one aspect of the embodiments to provide a distance measuring apparatus, a distance measuring method, and a computer-readable storage medium, which can detect edge noise from a range image (or depth map) representing distances to each of range (or distance) measurement points.

According to one aspect of the embodiments, a distance measuring apparatus includes a sensor configured to make a two-dimensional scan by launching a pulse laser beam and to measure a distance to a target based on reflected light received from the target; a memory configured to store a program; and a processor configured to execute the program and perform a process that includes generating a difference binary image from a first range image that is generated in a state in which the target does not exist with respect to a background and represents distances to each of a plurality of range measurement points, and a second range image that is generated in a state in which the target exists with respect to the background and represents the distances to each of the plurality of range measurement points; extracting a first region having a size that is greater than or equal to a first threshold value, from a non-background region of the difference binary image made up of a plurality of non-background points; grouping adjacent points on the second range image into a plurality of groups of adjacent points having close distance values, for each of the points within the first region of the difference binary image, to extract second regions respectively corresponding to each of the plurality of groups of adjacent points having the close distance values, wherein the adjacent points having the close distance values refer to points having distance values with a difference that is less than or equal to a threshold value; and extracting a third region having a size that is less than or equal to a second threshold value, from the second regions of the difference binary image, to output a judgment result which judges that each of a plurality of points within the third region is edge noise.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram for explaining an example of a process of step S2;

FIG. 6 is a diagram for explaining an example of a process of step S3;

FIG. 20 is a diagram for explaining an example of the noise reduction process.

DESCRIPTION OF EMBODIMENTS

Preferred embodiments of the present invention will be described with reference to the accompanying drawings.

A description will now be given of a distance measuring apparatus, a distance measuring method, and a computer-readable storage medium in each embodiment according to the present invention.

The disclosed distance measuring apparatus, distance measuring method, and computer-readable storage medium measure a distance to a target based on reflected light received from the target in response to making a two-dimensional scan by launching a pulse laser beam. A distance measuring process includes (a) generating a difference binary image from a first range image that is generated in a state in which the target does not exist with respect to a background and represents distances to each of a plurality of range measurement points, and a second range image that is generated in a state in which the target exists with respect to the background and represents the distances to each of the plurality of range measurement points;

(b) extracting a first region having a size that is greater than or equal to a first threshold value, from a non-background region of the difference binary image made up of a plurality of non-background points;

(c) grouping adjacent points on the second range image into a plurality of groups of adjacent points having close distance values, for each of the points within the first region of the difference binary image, to extract second regions respectively corresponding to each of the plurality of groups of adjacent points having the close distance values, wherein the adjacent points having the close distance values refer to points having distance values with a difference that is less than or equal to a threshold value; and (d) extracting a third region having a size that is less than or equal to a second threshold value, from the second regions of the difference binary image, to output a judgment result which judges that each of a plurality of points within the third region is edge noise.

Figure 1:
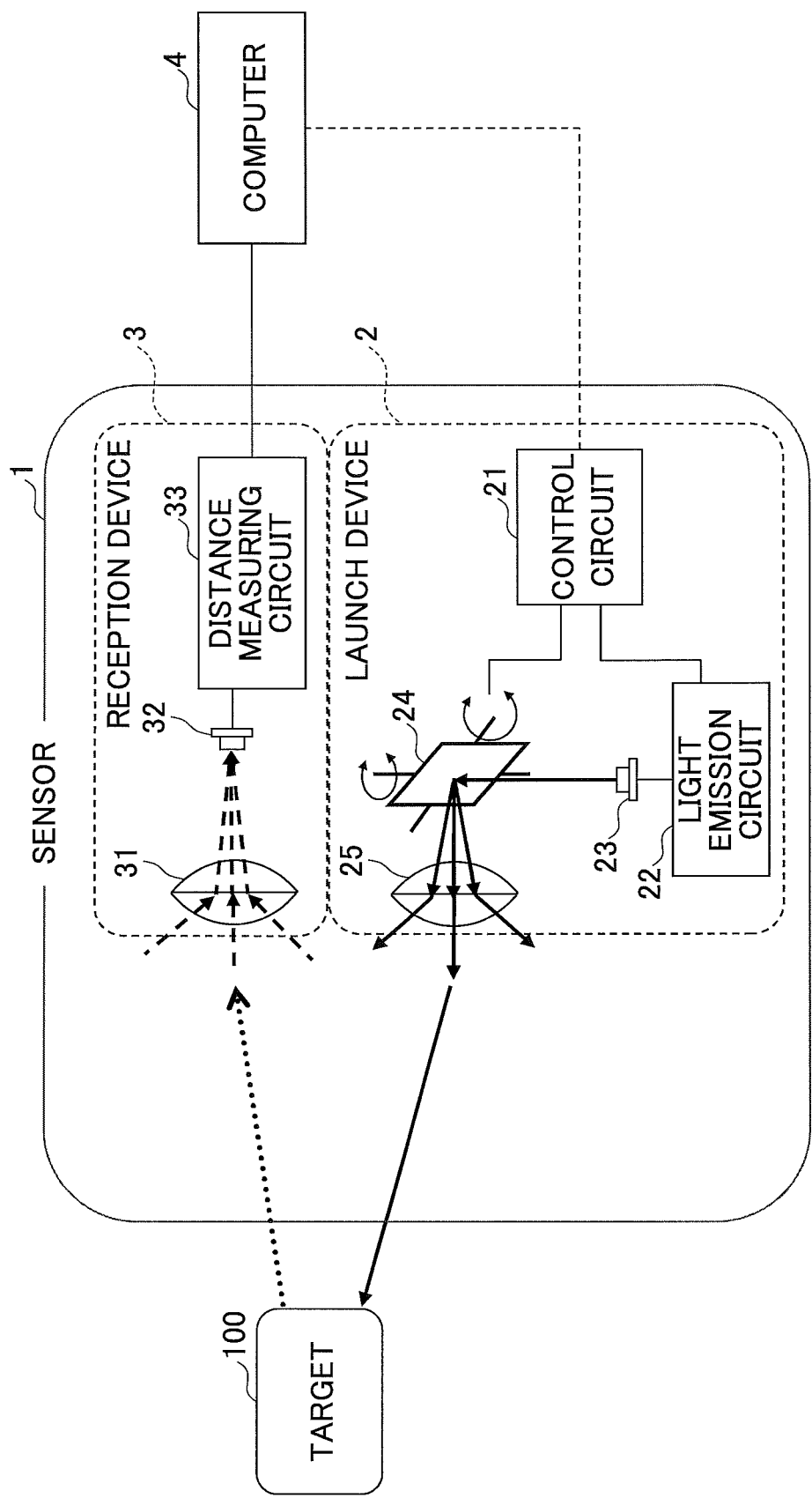
FIG. 1 is a diagram illustrating an example of a distance measuring apparatus in one embodiment.

FIG. 1 is a diagram illustrating an example of a distance measuring apparatus in one embodiment. The distance measuring apparatus illustrated in FIG. 1 has a sensor 1 including a light launch unit or device (hereinafter simply referred to as a "launch unit") 2 and a light reception unit or device (hereinafter simply referred to as a "reception unit") 3, and a computer 4.

The launch unit 2 may have a known configuration including a control circuit 21, a light emission circuit 22, a laser light source 23, a two-dimensional MEMS (Micro Electro Mechanical System) mirror 34, and a scan angle magnification lens 25, for example. In other words, the launch unit 2 is a hardware device. The control circuit 21 controls the light emission circuit 22 so that the laser light source 23 emits a pulse laser beam under the control of the light emission circuit 22. In addition, the control circuit 21 controls a known drive part (not illustrated) that drives the two-dimensional MEMS mirror 34 two-dimensionally, so that the laser beam emitted from the laser light source 23 scans two-dimensionally (for example, in a horizontal direction and a vertical direction with respect to ground surface). Accordingly, the laser beam makes a two-dimensional scan via the scan angle magnification lens 25 as indicated by a solid line in FIG. 1. The laser beam reflected by a target 100, which is an example of an object to be measured, is received by the reception unit 3 as indicated by a dotted line in FIG. 1. The laser light source 23 may have a known configuration to emit an infrared or near-infrared laser beam, for example.

The reception unit 3 may have a known configuration including a reception lens 31, a photodetector 32, and a distance measuring circuit 33. In other words, the reception unit 3 is a hardware device. The laser beam deflected by the target 100 is detected by the photodetector 32 via the reception lens 31. A detection output of the photodetector 32 is supplied to the distance measuring circuit 33. The distance measuring circuit 33 measures a TOF (Time Of Flight) $\Delta T$ of the laser beam that is launched from the distance measuring apparatus, reflected by the target 100, and returned and received by the distance measuring apparatus, to optically measure the distance to the target 100 and output a signal indicating the measured distance. When the velocity c of light is regarded to be approximately 300,000 km/s, the distance to the target 100 can be obtained from (c×ΔT)/2, for example.

The signal indicating the distances to each of range measurement points measured by the distance measuring circuit 33 is output from the reception unit 3 to the computer 4. The range measurement points refer to points on the target 100 to be measured, where the laser beam launched from the sensor 1 reaches. In this example, the range measurement points include points on the target 100, and points on a background within a scan range of the laser beam. In addition, the distances to the range measurement points refer to the distances from the sensor 1 to the range measurement points. The computer 4 generates a range image (or depth map) representing the distances to each of the range measurement points, based on the signal indicating the distances to each of the range measurement points. In this example, the computer 4 generates a range image representing the distances to each of the range measurement points by pixels having colors according to the distances, based on the signal indicating the distances to each of the range measurement points. As indicated by a dotted line in FIG. 1, the computer 4 may set a light emission timing, a light emission power, or the like of the laser light source 23 that is controlled by the control circuit 21 of the launch unit 2.

Figure 2:
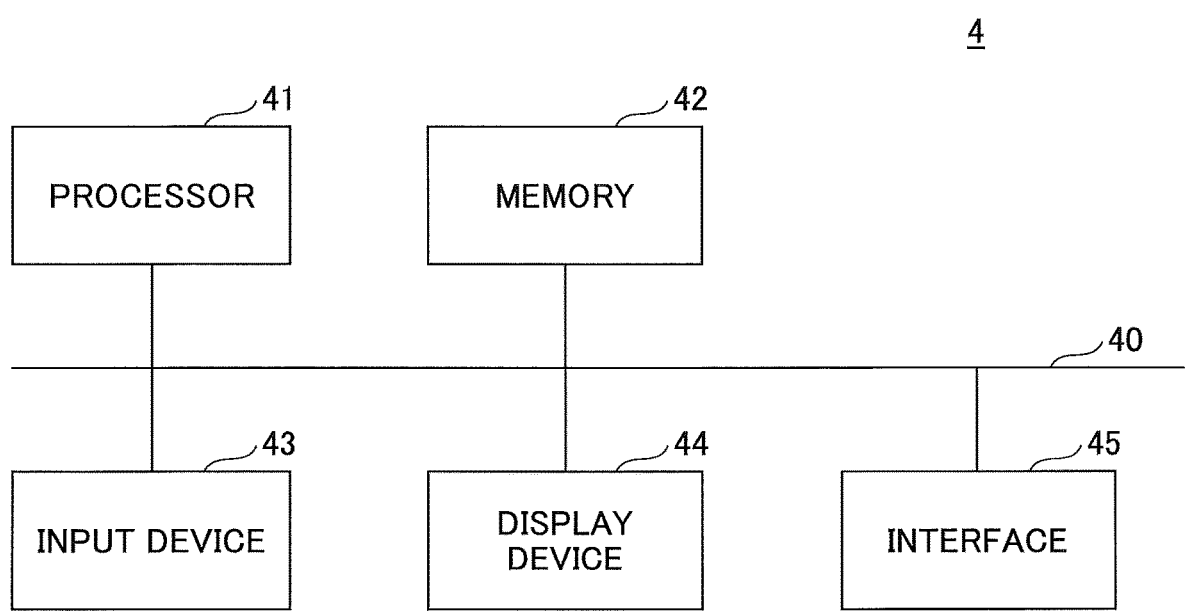
FIG. 2 is a block diagram illustrating an example of a computer.

The computer 4 may have a configuration illustrated in FIG. 2, for example. FIG. 2 is a block diagram illustrating an example of the computer. The computer 4 illustrated in FIG. 2 includes a processor 41, a memory 42, and input device 43, a display device 44, and an interface (or communication device) 45 that are connected to each other via a bus 40. The processor 41 may be formed by a CPU (Central Processing Unit) or the like, for example. The processor 41 executes one or more programs stored in the memory 42, to control the entire computer 4. The memory 42 may be formed by computer-readable storage medium such as a semiconductor memory device, a magnetic recording medium, an optical recording medium, a magneto-optic recording medium, or the like, for example. The memory 42 stores various programs including a distance measuring program executed by the processor 41, various data, or the like. The memory 42 may be formed by a non-transitory computer-readable storage medium that stores at least one program to be executed by the processor 41.

The input device 43 may be formed by a keyboard or the like that is operated by a user (or operator) to input commands and data to the processor 41. The display device 44 may display messages, measured results of the distance measuring process, such as the range images, or the like with respect to the user. The interface 45 may communicably connect the computer 4 to another computer or the like. In this example, the computer 4 is connected to the control circuit 21 of the launch unit 2 via the interface 45.

The computer 4 is not limited to a hardware configuration in which constituent elements of the computer 4 are connected via the bus 40 as illustrated in FIG. 2. The computer 4 may be formed by a general-purpose computer, for example.

The input device 43 and the display device 44 of the computer 4 may be omitted. In addition, in a case in which a module, a semiconductor chip, or the like has the computer 4 in which the interface 45 is further omitted in addition to the input device 43 and the display device 44, the output of the sensor 1 (that is, the output of the distance measuring circuit 33) may be connected to the bus 40, or may be connected directly to the processor 41.

First Embodiment

Figure 3:
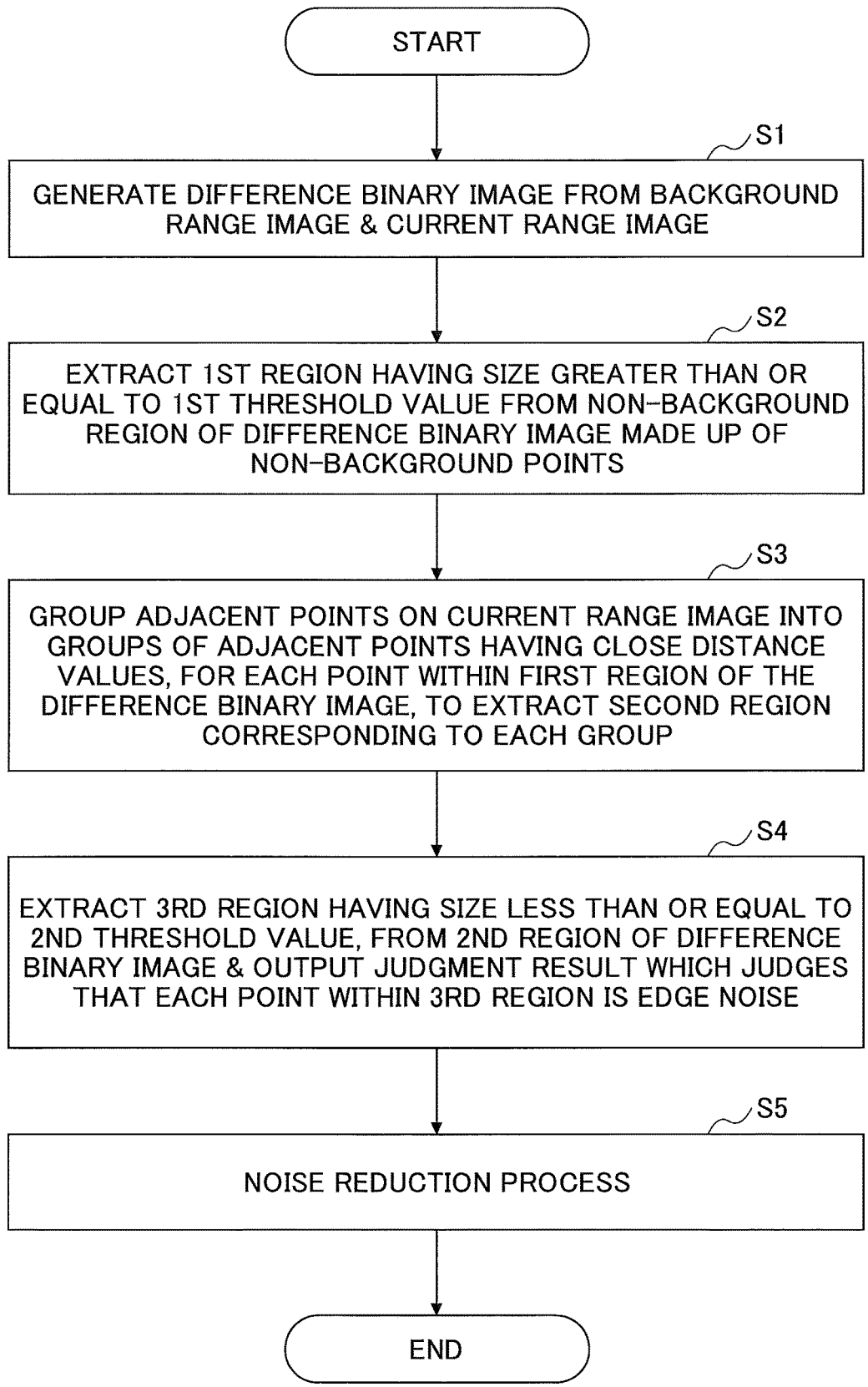
FIG. 3 is a flow chart for explaining an example of a distance measuring process in a first embodiment.
Figure 4:
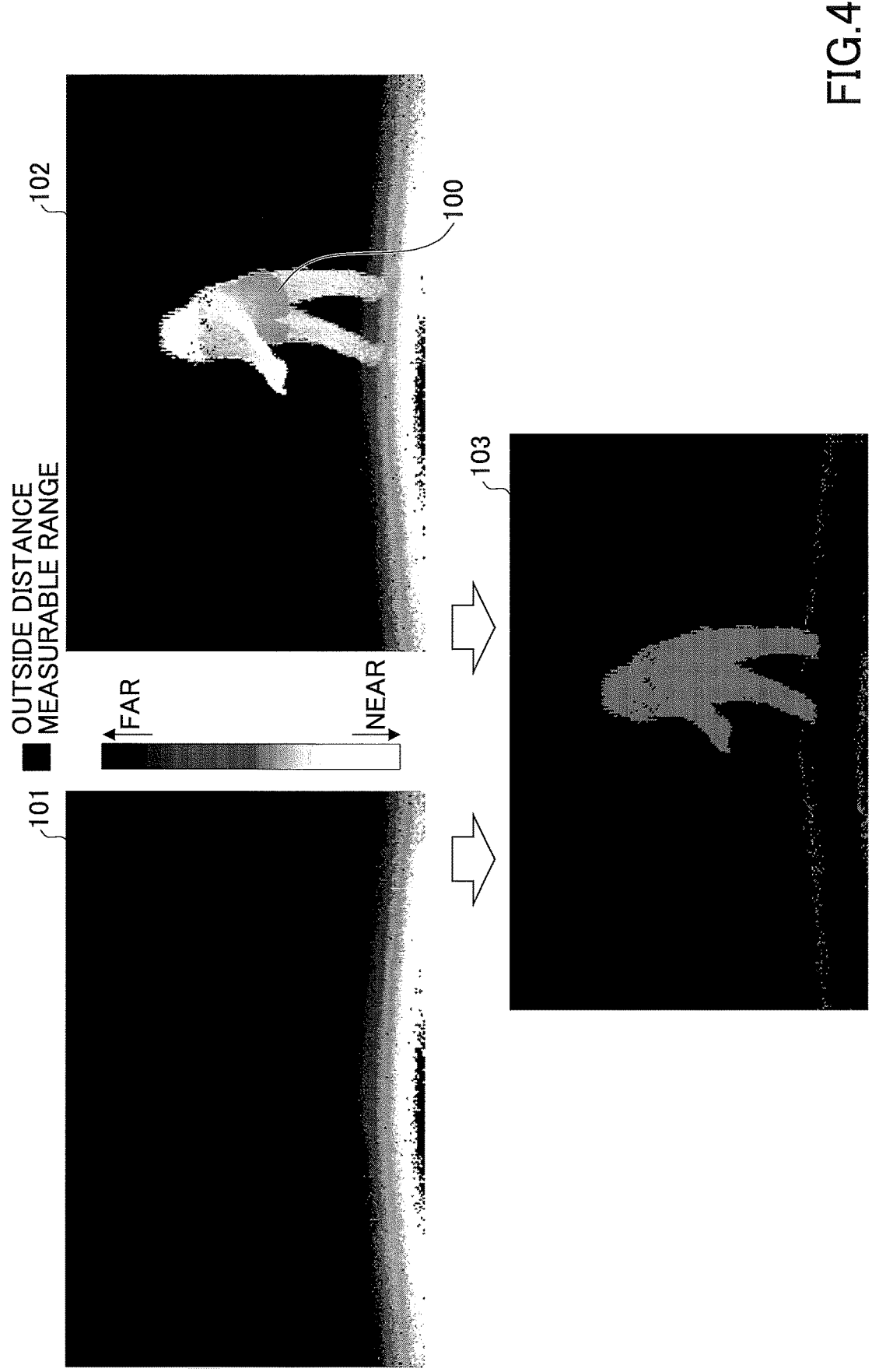
FIG. 4 is a diagram for explaining an example of a process of step S1.

FIG. 3 is a flow chart for explaining an example of a distance measuring process in a first embodiment. For example, the processor 41 of the computer 4 illustrated in FIG. 2 may execute a program stored in the memory 42, to perform the distance measuring process illustrated in FIG. 3. In step S1 illustrated in FIG. 3, the processor 41 generates a difference binary image from two kinds of range images representing the distances to each of the range measurement points by pixels having colors according to the distance values, for example. More particularly, as illustrated in FIG. 4, a difference binary image 103 is generated from a background range image 101 and a current range image 102. FIG. 4 is a diagram for explaining an example of a process of step S1. The background range image 101 refers to a range image that is generated in a state in which no target exists with respect to the background, for example. On the other hand, the current range image 102 refers to a range image that is generated in a state in which the target 100 exists with respect to the background. For the sake of convenience, in the background range image 101 and the current range image 102 illustrated in FIG. 4, the whiter the pixel, the closer the distance is to a corresponding range measurement point, and the darker the halftone of the pixel, the farther the distance is to the corresponding range measurement point. In addition, a black pixel indicates a distance to the corresponding range measurement point that is outside a measurable range. Further, for the sake of convenience, in the difference binary image 103 illustrated in FIG. 4, two different tone levels of the halftone are merely used to distinguish the different binary values, and do not indicate the distance values to each of the range measurement points as in the case of the tone levels of the halftone used in the background range image 101 and the current range image 102 described above.

One point at a two-dimensional coordinate within the range image representing the distances to each of the range measurement points by the pixels having the colors according to the distance values may correspond to one pixel of the range image, for example, or may correspond to a plurality of pixels of the range image. Whether to make one point at the two-dimensional coordinate within the range image representing the distances to each of the range measurement points by the pixels having the colors according to the distance values correspond to one pixel of the range image, or correspond to a plurality of pixels of the range image, may be selected depending on a pulse period of the pulse laser beam, a resolution required of the range image, or the like, for example.

In step S2, the processor 41 extracts a first region 100A having a size that is greater than or equal to a first threshold value, from a non-background region of the difference binary image 103 made up of non-background points, as illustrated in FIG. 5. FIG. 5 is a diagram for explaining an example of a process of step S2.

In step S3, the processor 41 groups adjacent points on the current range image 102 into groups of adjacent points having close distance values, for each of the points within the first region 100A of the difference binary image 103, to extract second regions 100B respectively corresponding to each group of adjacent points having the close distance values, as illustrated in FIG. 6. FIG. 6 is a diagram for explaining an example of a process of step S3. For the sake of convenience, FIG. 6 illustrates each of the second regions 100B by a different tone level of the halftone, however, the tone level does not indicate the distance value to each of the range measurement points.

Figure 7:
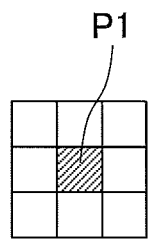
FIG. 7 is a diagram for explaining adjacent points having close distance values.

FIG. 7 is a diagram for explaining adjacent points having close distance values. In an example illustrated in FIG. 7, eight adjacent points are provided adjacent to a target point P1 indicated by hatchings, for example. In the example illustrated in FIG. 7, the adjacent points are mutually adjacent points. In addition, the points having the close distance values refer to points having distance values with a difference that is less than or equal to a threshold value.

Figure 8:
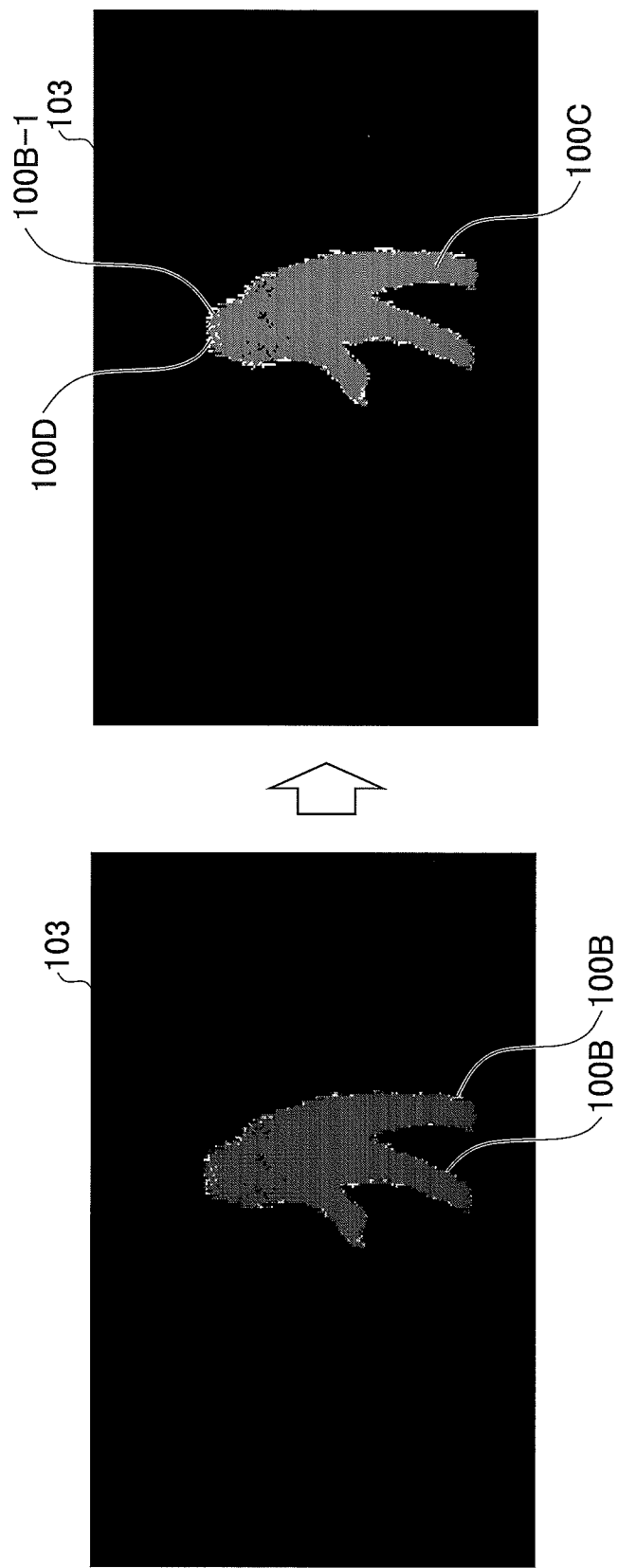
FIG. 8 is a diagram for explaining an example of a process of step S4.

In step S4, the processor 41 extracts a third region 100-B1 having a size that is less than or equal to a second threshold value, from the second regions 100B of the difference binary image 103, and outputs a judgment result which judges that each point within the third region 100B-1 is the edge noise. The judgment result of step S4 may be displayed on the display device 44 illustrated in FIG. 2, for example, or may be output to an external apparatus (not illustrated), such as another computer or the like, via the interface 45 illustrated in FIG. 2, for example. FIG. 8 is a diagram for explaining an example of a process of step S4. For the sake of convenience, points 100C within a region indicated by grey halftone correspond to points forming the target 100, points 100D within a white region correspond to points forming the edge noise, and points within a black region correspond to points forming the background.

It is conceivable to detect the edge noise by judging whether a point is within a contour part of the target 100, for example. However, in a case in which the target 100 is a human being whose legs are not spread open, for example, the edge noise between the legs cannot be detected. On the other hand, according to the process of step S4, even in the case in which the target 100 is a human being whose legs are not spread open, for example, it is possible to detect the edge noise between the legs.

Figure 9:
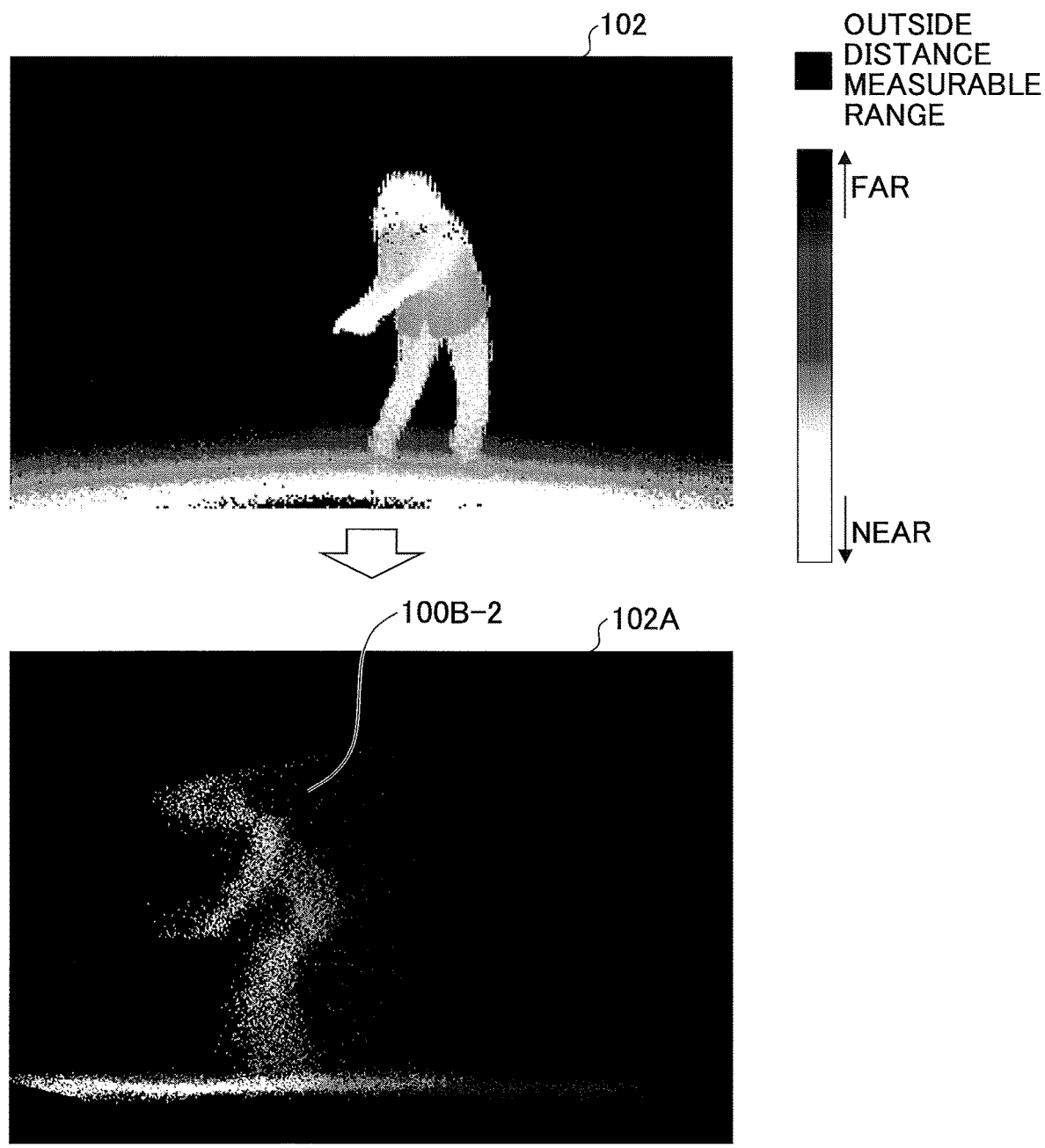
FIG. 9 is a diagram for explaining an example of a 3-dimensional image generation of a target based on a current range image that is not subjected to a noise reduction process.
Figure 10:
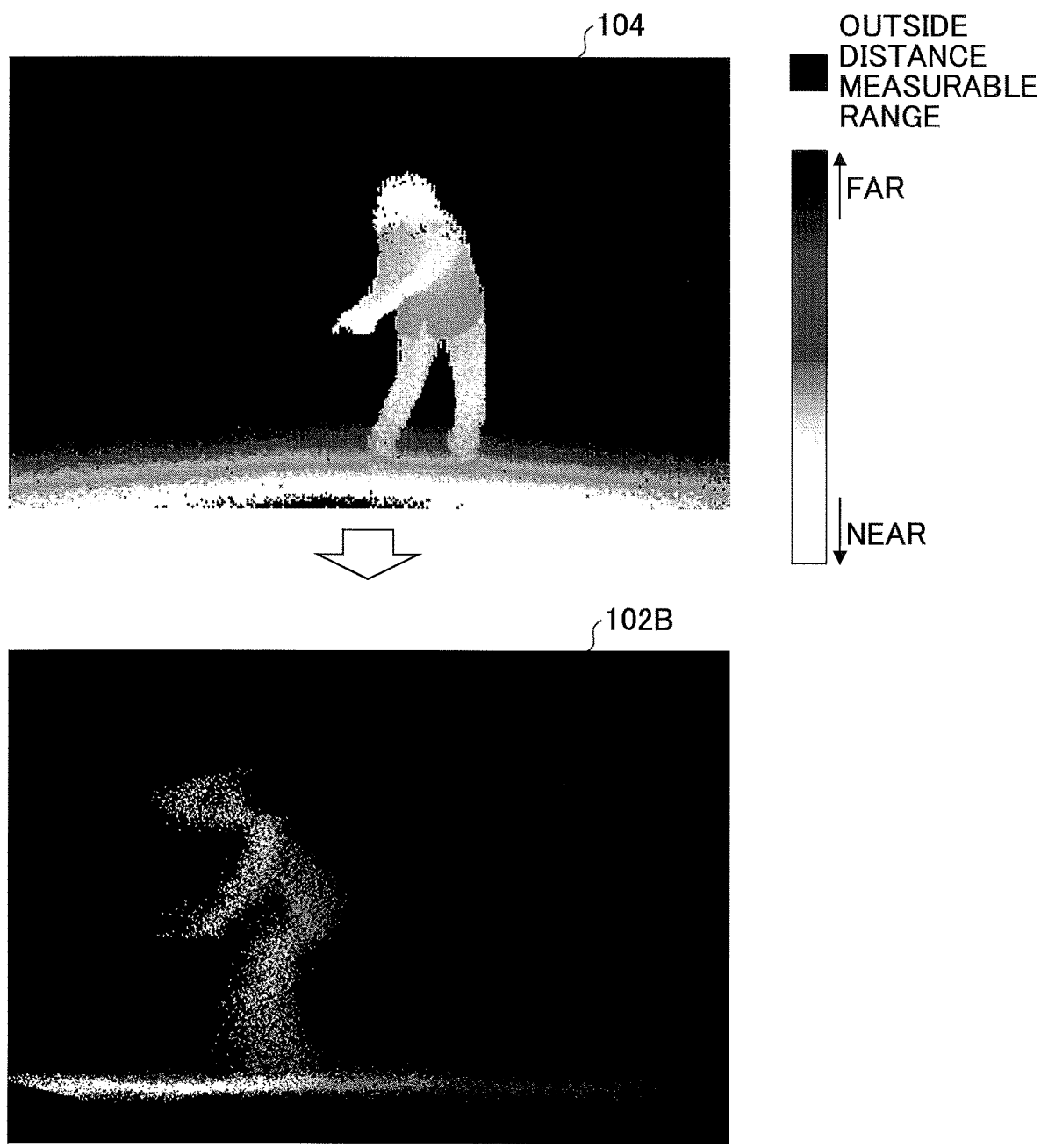
FIG. 10 is a diagram for explaining an example of a 3-dimensional image generation of the target based on a range image that is subjected to a noise reduction process.

The process may end after step S4. But instead, a noise reduction process of step S5 may be performed after step S4. In step S5, the processor 41 performs the noise reduction process to reduce the edge noise detected in step S4, from the current range image 102 illustrated in FIG. 9. A result of the noise reduction process of step S5 may be displayed on the display device 44 illustrated in FIG. 2, for example, or may be output to an external apparatus (not illustrated), such as another computer or the like, via the interface 45 illustrated in FIG. 2, for example. The current range image 102 illustrated in FIG. 9 is the same as the current range image 102 illustrated in FIG. 4. By performing the noise reduction process, it is possible to generate a range image 104 from which the edge noise has been reduced or eliminated, as illustrated in FIG. 10. Accordingly, the accuracy of the range image can be improved by performing the noise reduction process.

FIG. 9 is a diagram for explaining an example of a 3-dimensional image generation of a target based on a current range image that is not subjected to the noise reduction process. In addition, FIG. 10 is a diagram for explaining an example of a 3-dimensional image generation of the target based on a range image that is subjected to the noise reduction process. In the images illustrated in FIGS. 9 and 10, the whiter the pixel, the closer the distance is to the corresponding range measurement point, and the darker the halftone of the pixel, the farther the distance is to the corresponding range measurement point. In addition, the black pixel indicates the distance to the corresponding range measurement point that is outside a measurable range.

For example, when the three-dimensional image of the target is generated based on the current range image 102 illustrated in FIG. 9 that is not subjected to the noise reduction process, points 100B-2 forming the edge noise appear behind the target (on the right side of the target in FIG. 9) in a three-dimensional image 102A illustrated in FIG. 9. On the other hand, when the three-dimensional image of the target is generated based on the range image 104 illustrated in FIG. 10 that is subjected to the noise reduction process, no points forming the edge noise appear behind the target (on the right side of the target in FIG. 10) in a three-dimensional image 102B illustrated in FIG. 10. Hence, by performing the noise reduction process, it is possible to improve the accuracy of the three-dimensional image even in the case in which the three-dimensional image of the target is generated, for example.

In the distance measuring apparatus illustrated in FIG. 1 that measures the distance to the target 100 based on the reflected light of the pulse laser beam that makes the two-dimensional scan, the computer 4 may form an example of a device or means that performs the process of step S1, to generate the difference binary image 103 from the background range image 101 and the current range image 102. The background range image 101 is an example of a first range image that is generated in a state in which the target 100 does not exist with respect to the background and represents the distances to each of the range measurement points. The current range image 102 is an example of a second range image that is generated in a state in which the target 100 exists with respect to the background and represents the distances to each of the range measurement points. The computer 4 may form an example of a device or means that performs the process of step S2, to extract the first region 100A having the size that is greater than or equal to the first threshold value, from the non-background region of the difference binary image 103 made up of the non-background points. In addition, the computer 4 may form an example of a device or means that performs the process of step S3, to group adjacent points on the current range image 102 into groups of adjacent points having close distance values, for each of the points within the first region 100A of the difference binary image 103, and to extract the second regions 100B respectively corresponding to each group of adjacent points having the close distance values. Further, the computer 4 may form an example of a device or means that performs the process of step S4, to extract the third region 100-B1 having the size that is less than or equal to the second threshold value, from the second regions 100B of the difference binary image 103, and to output the judgment result which judges that each point 100D within the third region 100B-1 is the edge noise (100D).

The computer 4 may form an example of a device or means that performs the process of step S5, to perform the noise reduction process to reduce the edge noise 100D. The computer 4 may also form a device or means that performs the process to generate the range image that represents the distances to the range measurement points by the pixels having the colors according to the distances.

Figure 11:
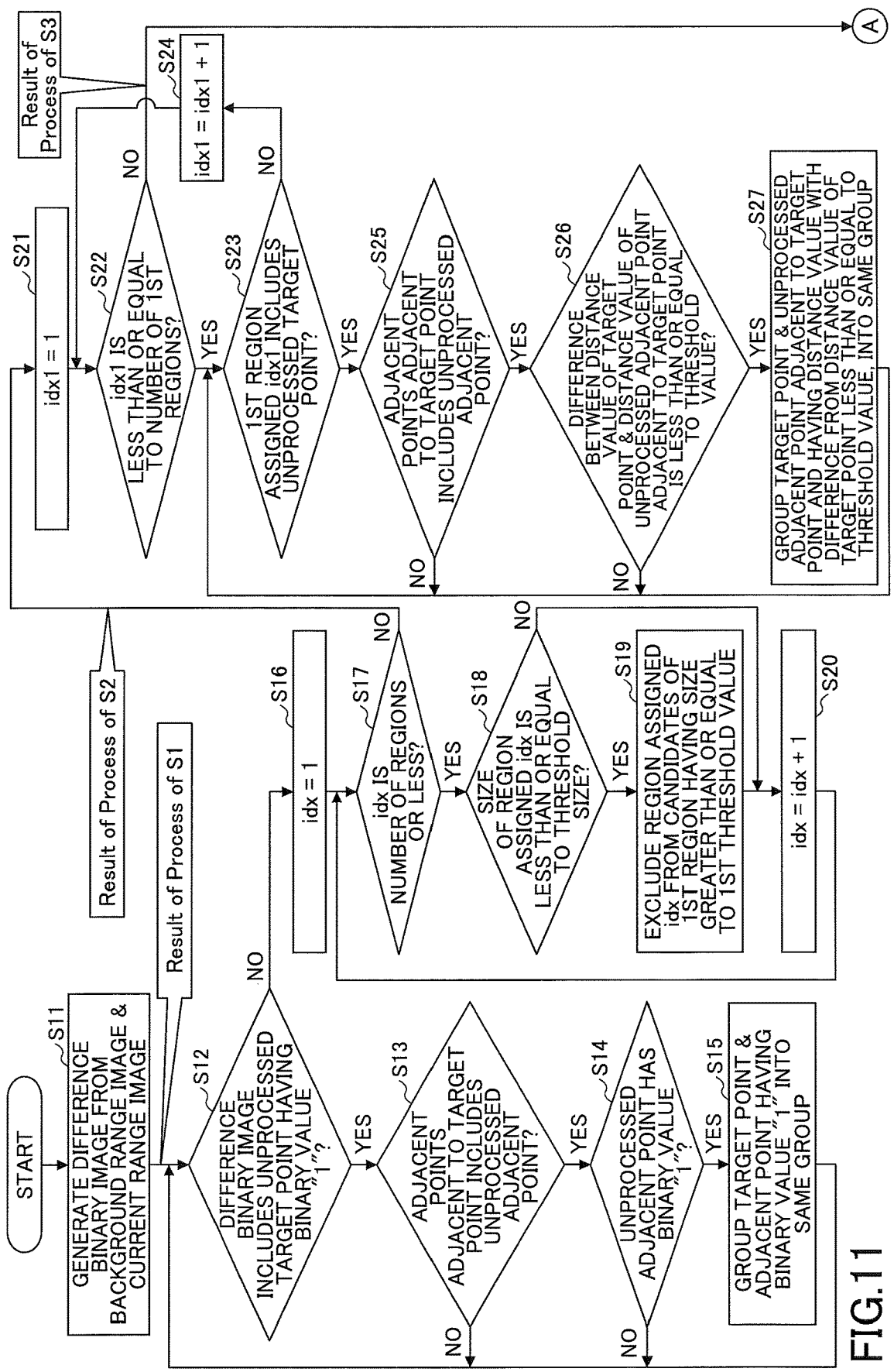
FIG. 11 is a flow chart for explaining, in more detail, the example of the distance measuring process in the first embodiment.
Figure 12:
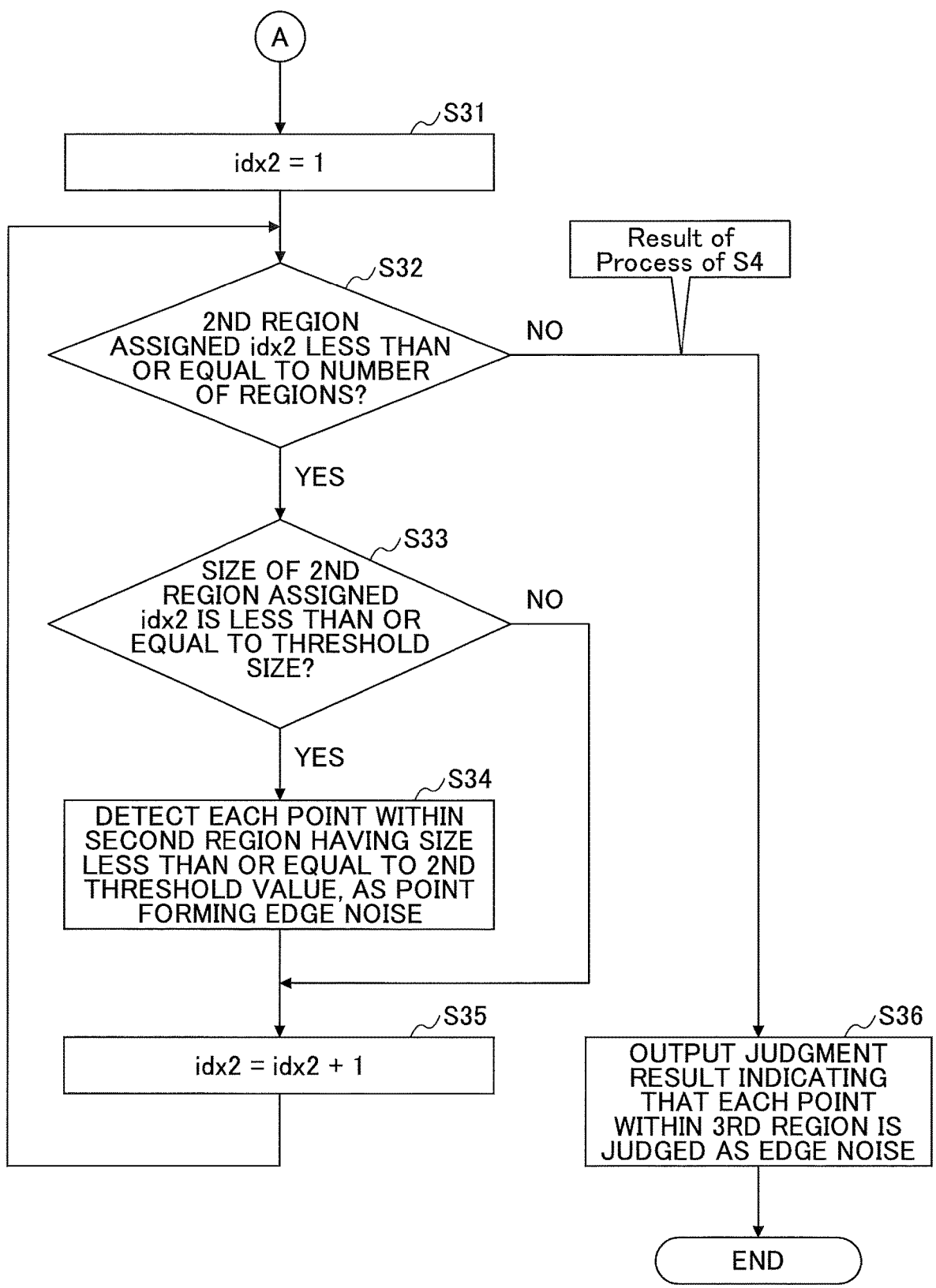
FIG. 12 is a flow chart for explaining, in more detail, the example of the distance measuring process in the first embodiment.

FIGS. 11 and 12 are flow charts for explaining, in more detail, the example of the distance measuring process in the first embodiment. For example, the processor 41 of the computer 4 illustrated in FIG. 2 may execute a program stored in the memory 42, to perform the distance measuring process illustrated in FIGS. 11 and 12. In step S11 illustrated in FIG. 11, the processor 41 generates the difference binary image 103 from the background range image 101 and the current range image 102 illustrated in FIG. 4. In the example illustrated in FIG. 4, between the different tone levels of the halftone in the difference binary image 103, the black background corresponds to a binary value "0", and the grey non-background corresponds to a binary value "1". The result of the process of step S11 may correspond to the result of the process of step S1 illustrated in FIG. 3.

In step S12, the processor 41 judges whether the difference binary image 103 includes an unprocessed target point having a binary value "1". The process advances to step S13 when the judgment result in step S12 is YES, and the process advances to step S16 which will be described later when the judgment result in step S12 is NO. In step S13, the processor 41 judges whether the adjacent points adjacent to the target point includes an unprocessed adjacent point. The process advances to step S14 when the judgment result in step S13 is YES, and the process returns to step S12 when the judgment result in step S13 is NO. In step S14, the processor 41 judges whether the unprocessed adjacent point has a binary value "1". The process advances to step S15 when the judgment result in step S14 is YES, and the process returns to step S12 when the judgment result in step S14 is NO. In step S15, the processor 41 groups the target point and the adjacent point having the binary value "1" into the same group, and the process returns to step S12.

On the other hand, in step S16, the processor 41 sets a number (or identification number) idx assigned to the region corresponding to the group formed in step S15 to idx=1. In step S17, the processor 41 judges whether the number idx is the number of regions or less. The process advances to step S18 when the judgment result in step S17 is YES, and the process advances to step S21 which will be described later when the judgment result in step S17 is NO. In step S18, the processor 41 judges whether the size of the region assigned the number idx is less than or equal to a threshold size. The process advances to step S19 when the judgment result in step S18 is YES, and the process advances to step S20 which will be described later when the judgment result in step S18 is NO. In step S19, the processor 41 excludes the region assigned the number idx from candidates of the first region 100A having the size greater than or equal to the first threshold value, and the process advances to step S20. In step S20, the processor 41 increments the number idx to idx=idx+1, and the process returns to step S17.

The result of the process in a case in which the judgment result in step S17 is NO corresponds to the result of the process of step S2 illustrated in FIG. 3, and the first region 100A can be extracted.

In step S21, the processor 41 sets a number (or identification number) idx1 to idx1=1, and the process advances to step S22. In step S22, the processor 41 judges whether the number idx1 is less than or equal to the number of first regions 100A. The process advances to step S23 when the judgment result in step S22 is YES, and the process advances to step S31 which will be described later in conjunction with FIG. 12 when the judgment result in step S22 is NO. In step S23, the processor 41 judges whether an unprocessed target point exists in the first region 100A assigned the number idx1. The process advances to step S24 when the judgment result in step S23 is NO, and the process advances to step S25 when the judgment result in step S23 is YES. In step S24, the processor 41 increments the number idx1 to idx1=idx1+1, and the process returns to step S22.

In step S25, the processor 41 judges whether the adjacent points adjacent to the target point includes an unprocessed adjacent point. The process advances to step S26 when the judgment result in step S25 is YES, and the process returns to step S23 when the judgment result in step S25 is NO. In step S26, the processor 41 judges whether a difference between the distance value of the target point and the distance value of the unprocessed adjacent point adjacent to the target point is less than or equal to a threshold value. The process advances to step S27 when the judgment result in step S26 is YES, and the process returns to step S23 when the judgment result in step S26 is NO. In step S27, the processor 41 groups the target point, and the unprocessed adjacent point that is adjacent to the target point and has the distance value with the difference from the distance value of the target point less than or equal to the threshold value, into the same group, and the process returns to step S23.

The result of the process in a case in which the judgment result in step S22 is NO corresponds to the result of the process of step S3 illustrated in FIG. 3, and the second region 100B can be extracted.

In step S31 illustrated in FIG. 12, the processor 41 sets a number (or identification number) idx2 to idx2=1, and the process advances to step S32. In step S32, the processor 41 judges whether the number idx2 is less than or equal to the number of second regions 100B. The process advances to step S33 when the judgment result in step S32 is YES, and the process advances to step S36 when the judgment result in step S32 is NO. In step S33, the processor 41 judges whether the size of the second region 100B assigned the number idx2 is less than or equal to the second threshold value. The process advances to step S34 when the judgment result in step S33 is YES, and the process advances to step S35 when the judgment result in step S33 is NO. In step S34, the processor 41 detects each point within the second region 100B having the size less than or equal to the second threshold value, as the point forming the edge noise, and the process advances to step S35. In step S35, the processor 41 increments the number idx2 to idx2=idx2+1, and the process returns to step S32.

The result of the process in a case in which the judgment result in step S32 is NO corresponds to the result of the process of step S4 illustrated in FIG. 3. The judgment result that is output indicates that each point within each third region 100B-1 is judged as being the edge noise. More particularly, in step S36, the processor 41 outputs the judgment result indicating that each point within each third region 100B-1 is judged as being the edge noise, and the process ends. In this case, the judgment result that is output may be displayed on the display device 44 illustrated in FIG. 2, for example, or may be output to an external apparatus (not illustrated), such as another computer or the like, via the interface 45 illustrated in FIG. 2, for example. A noise reduction process similar to that of step S5 illustrated in FIG. 3 may be performed after step S36, to reduce the edge noise that is detected.

According to this embodiment, it is possible to detect the edge noise from the range image representing the distances to each of the range measurement points. In addition, the detected edge noise may be reduced or eliminated from the range image by performing the noise reduction process, to improve the accuracy of the range image.

Second Embodiment

Figure 13:
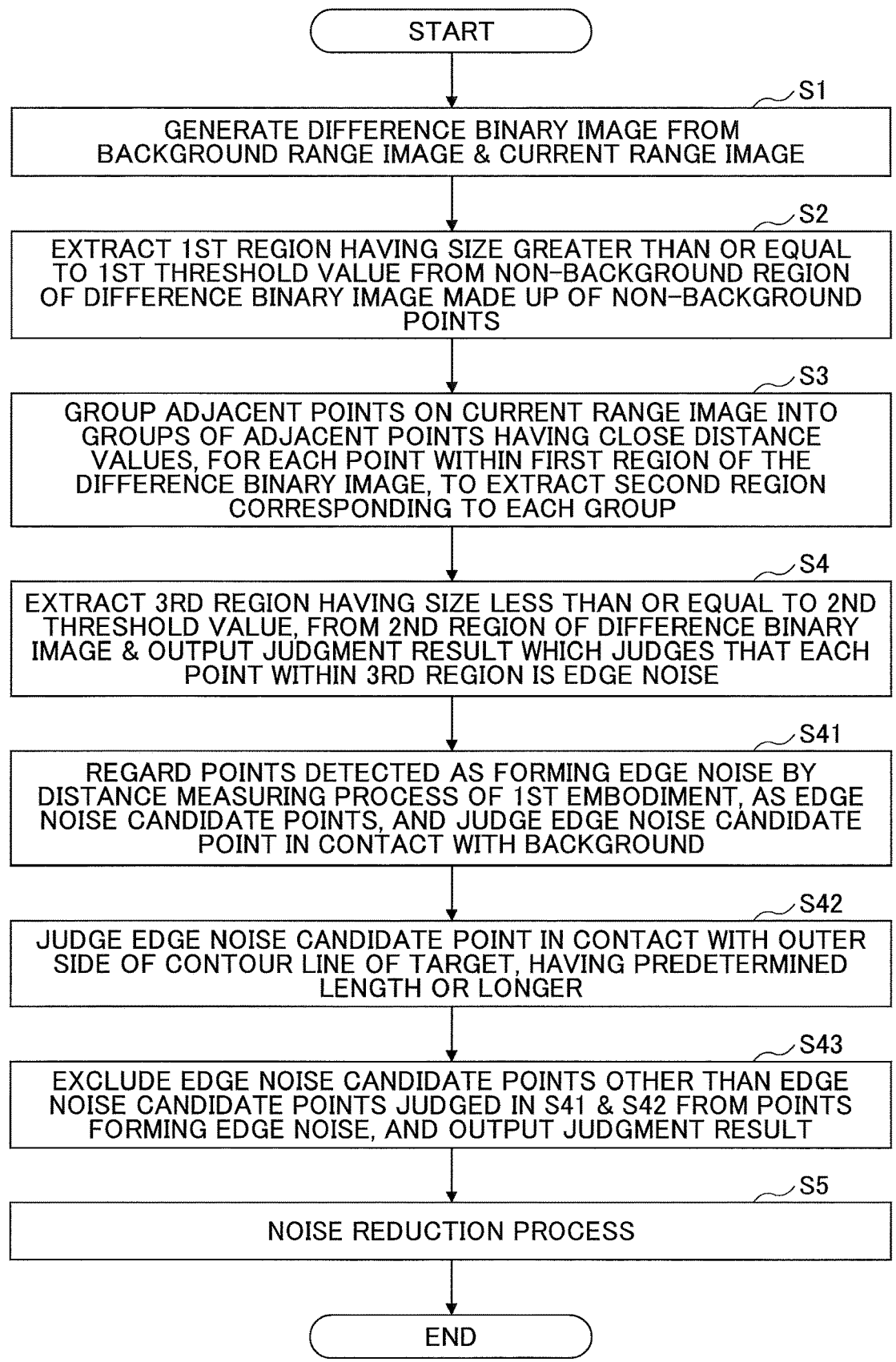
FIG. 13 is a flow chart for explaining an example of the distance measuring process in a second embodiment.

FIG. 13 is a flow chart for explaining an example of the distance measuring process in a second embodiment. For example, the processor 41 of the computer 4 illustrated in FIG. 2 may execute a program stored in the memory 42, to perform the distance measuring process illustrated in FIG. 13. In FIG. 13, steps S1 to S4 are the same as the corresponding steps of the first embodiment illustrated in FIG. 3.

In this embodiment, the points that are detected as forming the edge noise by steps S1 to S4 of the first embodiment described above are regarded as edge noise candidate points. In addition, amongst the edge noise candidate points, a first point in contact with the background, or a second point in contact with an outer side of a contour line of the target, having a predetermined length or longer, is judged as being the point forming the edge noise. Amongst the edge noise candidate points, points other than the first or second point are excluded from the points forming the edge noise, to further improve the edge noise detection accuracy. Of course, when the first and second points are judged as being the points forming the edge noise, the points other than the first and second points, amongst the edge noise candidate points, are excluded from the points forming the edge noise.

In step S41 illustrated in FIG. 13, the processor 41 regards the points that are detected as forming the edge noise by the distance measuring process of the first embodiment described above, as the edge noise candidate points, and judges the edge noise candidate point in contact with the background. In step S42, the processor 41 judges the edge noise candidate point in contact with the outer side of the contour line of the target, having the predetermined length or longer. In step S43, the processor 41 excludes the edge noise candidate points other than the edge noise candidate points judged in steps S41 and S42, from the points forming the edge noise. Further, in step S43, the processor 41 outputs a judgment result indicating that the edge noise candidate points judged in steps S41 and S42 are the points forming the edge noise. The judgment result that is output in step S43 may be displayed on the display device 44 illustrated in FIG. 2, for example, or may be output to an external apparatus (not illustrated), such as another computer or the like, via the interface 45 illustrated in FIG. 2, for example. A noise reduction process similar to that of step S5 illustrated in FIG. 3 may be performed after step S43, to reduce the edge noise that is detected.

Figure 14:
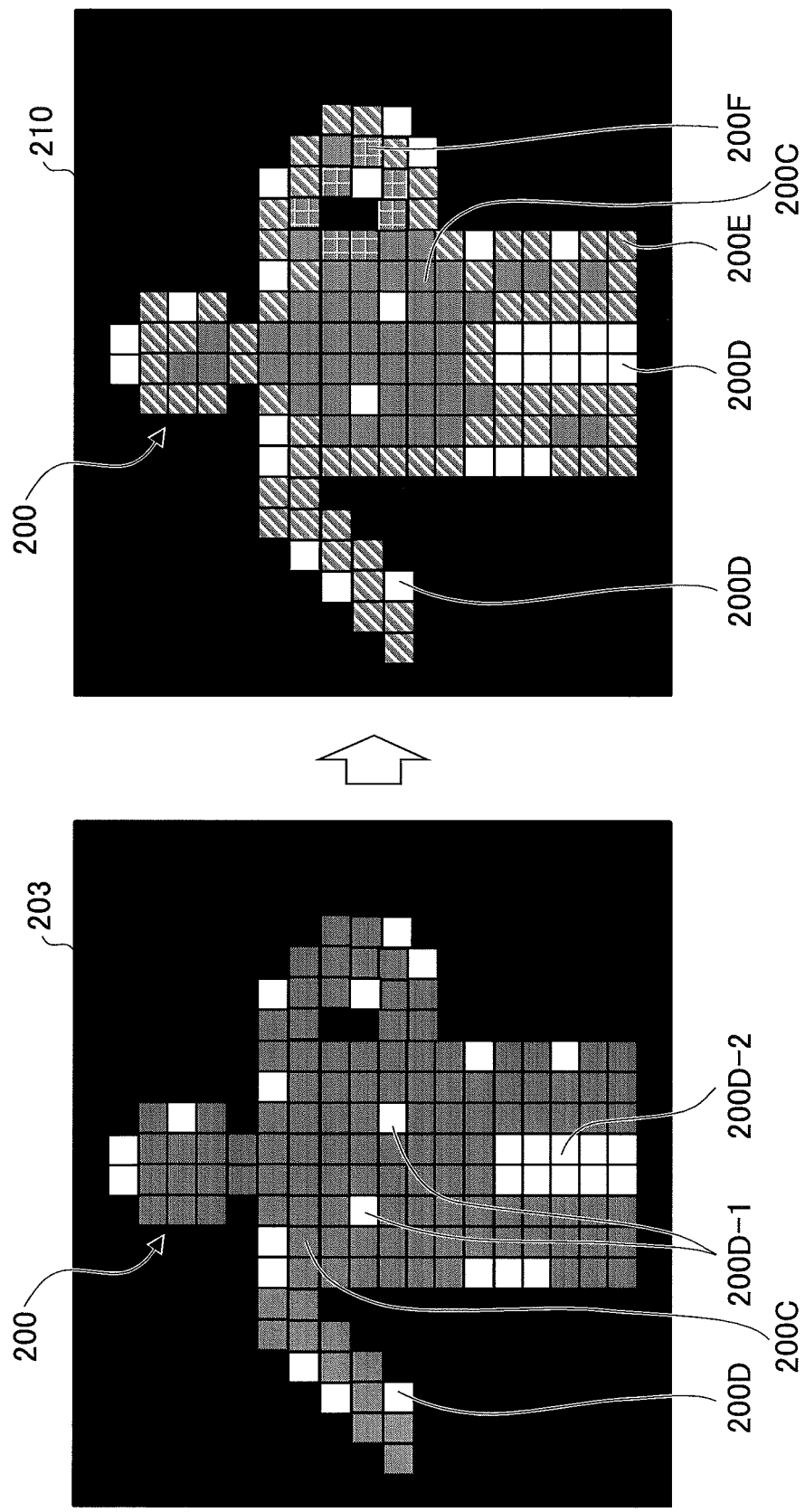
FIG. 14 is a diagram for explaining an example of processes of steps S41 to S43.

FIG. 14 is a diagram for explaining an example of processes of steps S41 to S43. In FIG. 14 and FIGS. 15, 19, and 20 which will be described later, for the sake of convenience, each point (corresponding to one or more pixels) is illustrated by an enlarged square. In FIG. 14, in a difference binary image 203 that is obtained by the processes of steps S1 to S4, a point 200C indicated by a grey halftone corresponds to a target 200, a white point 200D corresponds to the edge noise, and a black point corresponds to the background. In this example, the target 200 is a human being. A point 200D-1 is detected as the edge noise due to the effects of clothing or accessories worn by the target 200 and having a relatively low reflectivity. The point 200D-1 deteriorates the accuracy of a recognition process or the like that is subsequently performed using a difference binary image 203, when a point group density at the part of the target 200 decreases. For this reason, in order to prevent the point 200D-1 from being detected as the edge noise or eliminated, it is desirable to replace the point 200D-1 by a point that does not form the edge noise or a point that is at the same distance as the target 200. On the other hand, a point 200D-2 is located between the legs of the target 200 and is detected as the edge noise. If the point 200D-2 between the legs of the target 200 were replaced by the point that is at the same distance as the target 200, the legs would appear as if the legs were connected in the range image. For this reason, it is desirable to judge the point 200D-2 as the edge noise or to eliminate the point 200D-2 as the edge noise.

Accordingly, in this embodiment, the processes of steps S41 to S43 obtain from the difference binary image 203 a difference binary image 210 in which the edge noise is narrowed down. In the difference binary image 210 illustrated in FIG. 14, points 200E indicated by leftwardly declining hatching patterns and points 200F indicated by lattice patterns respectively form the contour line of the target 200, having the predetermined length or longer.

Figure 15:
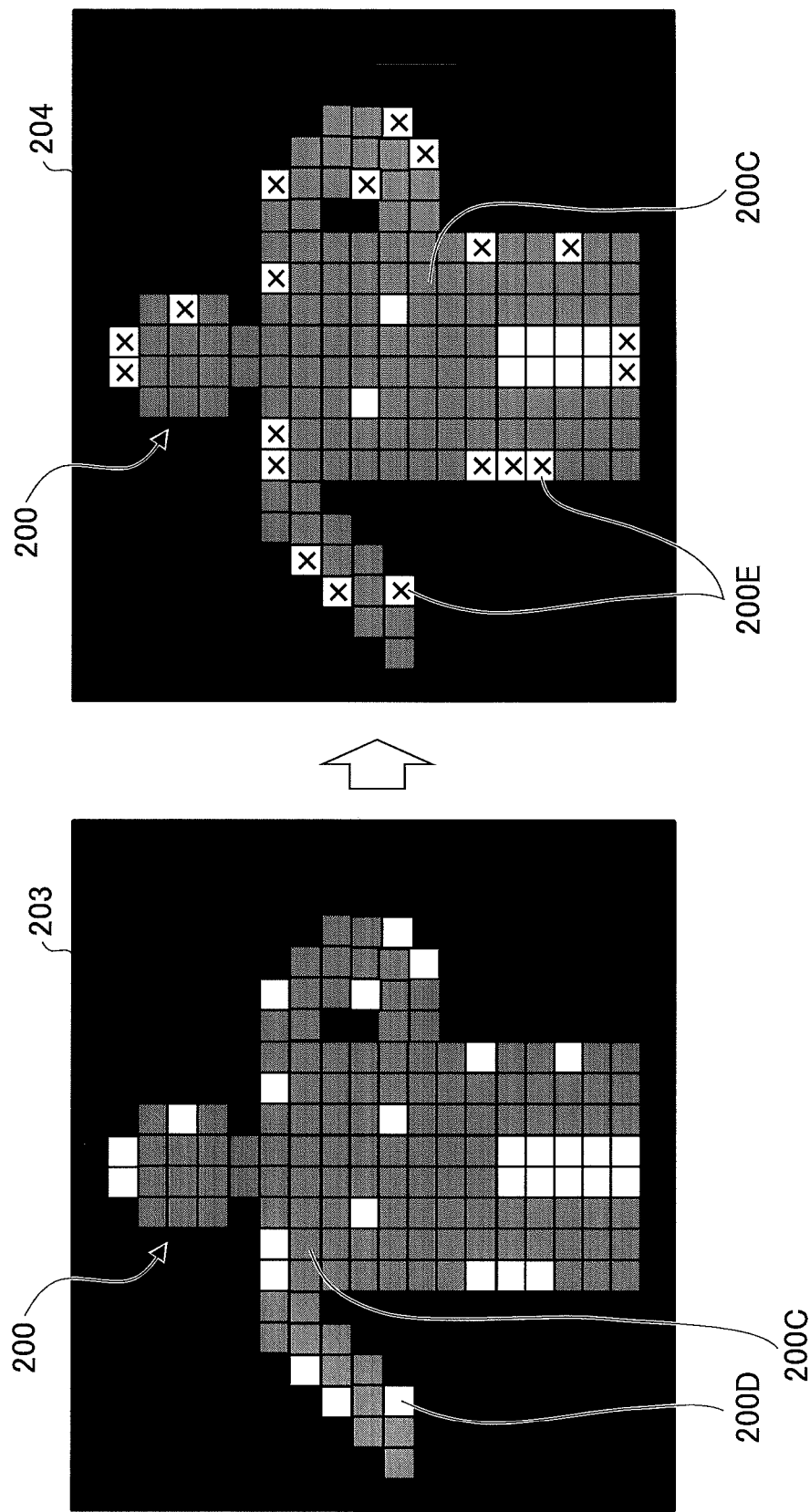
FIG. 15 is a diagram for explaining an example of a process of step S41.

FIG. 15 is a diagram for explaining an example of a process of step S41. In the difference binary image 203 illustrated in FIG. 15 that is obtained by the processes of steps S1 to S4, the point 200C indicated by the grey halftone corresponds to the point forming the target 200, the white point 200D corresponds to the point forming the edge noise, and the black point corresponds to the point forming the background. In step S41, the processor 41 regards the point 200D that is detected from the difference binary image 203 as forming the edge noise by the distance measuring process, as the edge noise candidate point, and generates the difference binary image 204 in which the point 200E is judged as the edge noise candidate point in contact with the background. In the difference binary image 204, the edge noise candidate point 200E in contact with the background is indicated by a symbol "x" in FIG. 15.

Figures 16, 17:
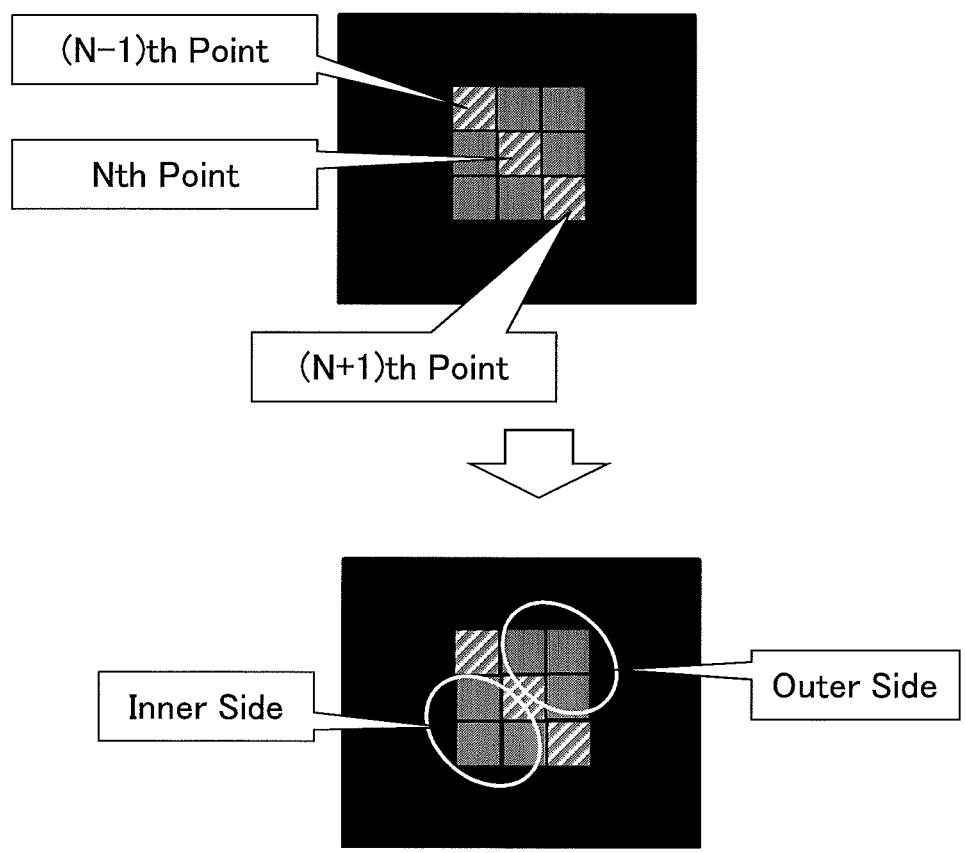
FIG. 16 is a diagram for explaining an example of judging an inner side and an outer side of a contour line.
FIG. 17 is a diagram for explaining the example of judging the inner side and the outer side of the contour line.

FIGS. 16 and 17 are diagrams for explaining an example of judging an inner side and an outer side of a contour line. In FIG. 16, the target point is indicated by a black square, and numbers "0" to "7" are assigned clockwise to the adjacent points adjacent to the target point. In FIG. 17, amongst three intermediate points on the contour line of the target 200, the Nth point is taken as a reference. When viewed from this Nth reference point, the (N−1)th point is assigned the number "7", and the (N+1)th point is assigned the number "3". In addition, amongst the adjacent points adjacent to the Nth reference point, the points assigned the numbers "0" to "3" clockwise correspond to the outer side of the contour line, and the points assigned the numbers "4" to "6" clockwise correspond to the inner side of the contour line. In this example, because the points assigned the numbers "0" to "3" correspond to the outer side of the contour line, these points adjacent to the outer side of the contour line of the target 200 can be judged as being the edge noise candidate points.

Figure 18:
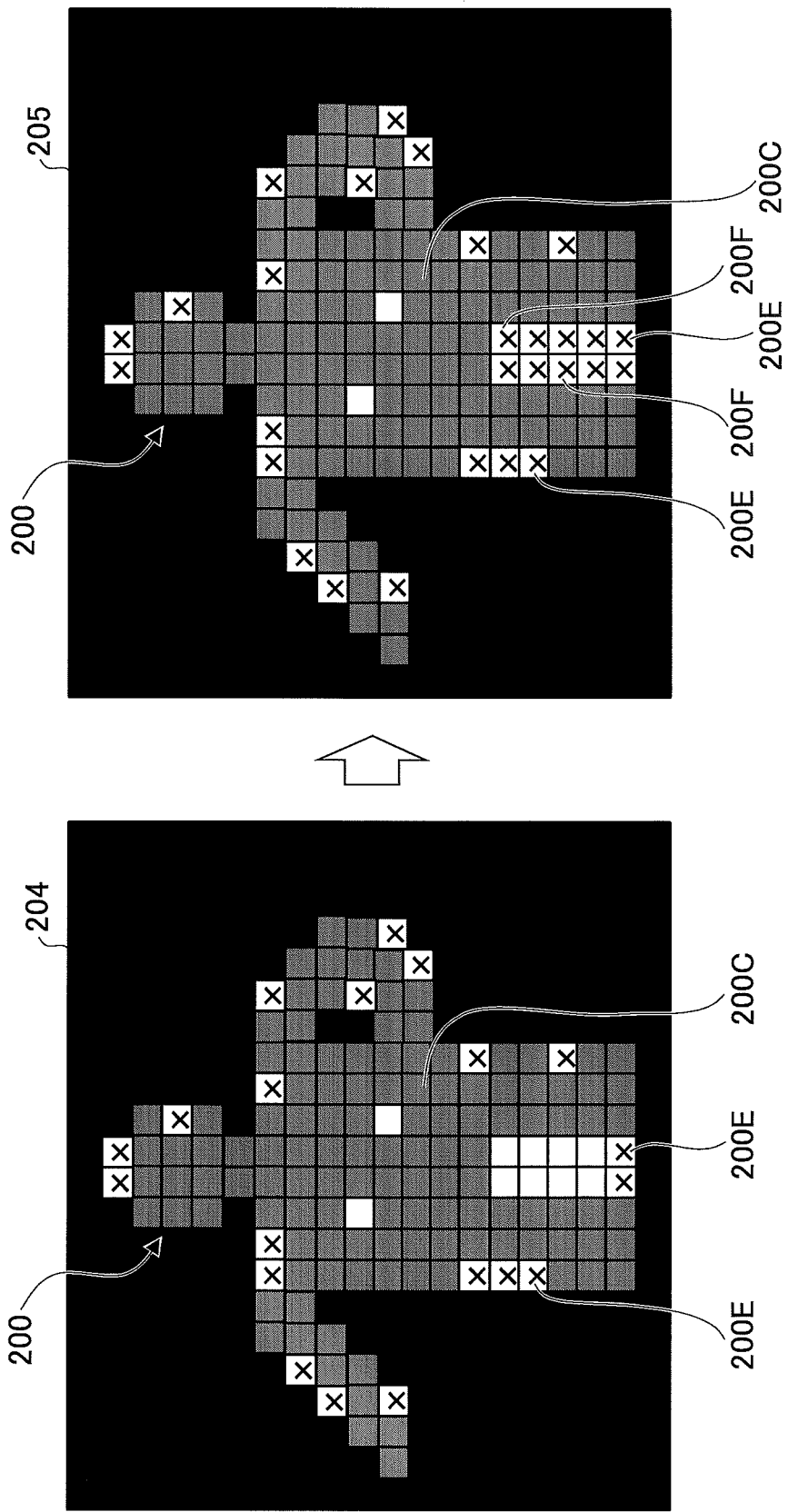
FIG. 18 is a diagram for explaining an example of a process of step S42.

FIG. 18 is a diagram for explaining an example of a process of step S42. From the difference binary image 204 including the edge noise candidate points 200E judged in step S41, the processor 41 judges, in step S42, the edge noise candidate points 200F in contact with the outer side of the contour line of the target 200, having the predetermined length or longer, by the method described above in conjunction with FIGS. 16 and 17. In a difference binary image 205, the edge noise candidate point 200F in contact with the outer side of the contour line of the target 200, having the predetermined length or longer, is also indicated by a symbol "x" in FIG. 18.

Figure 19:
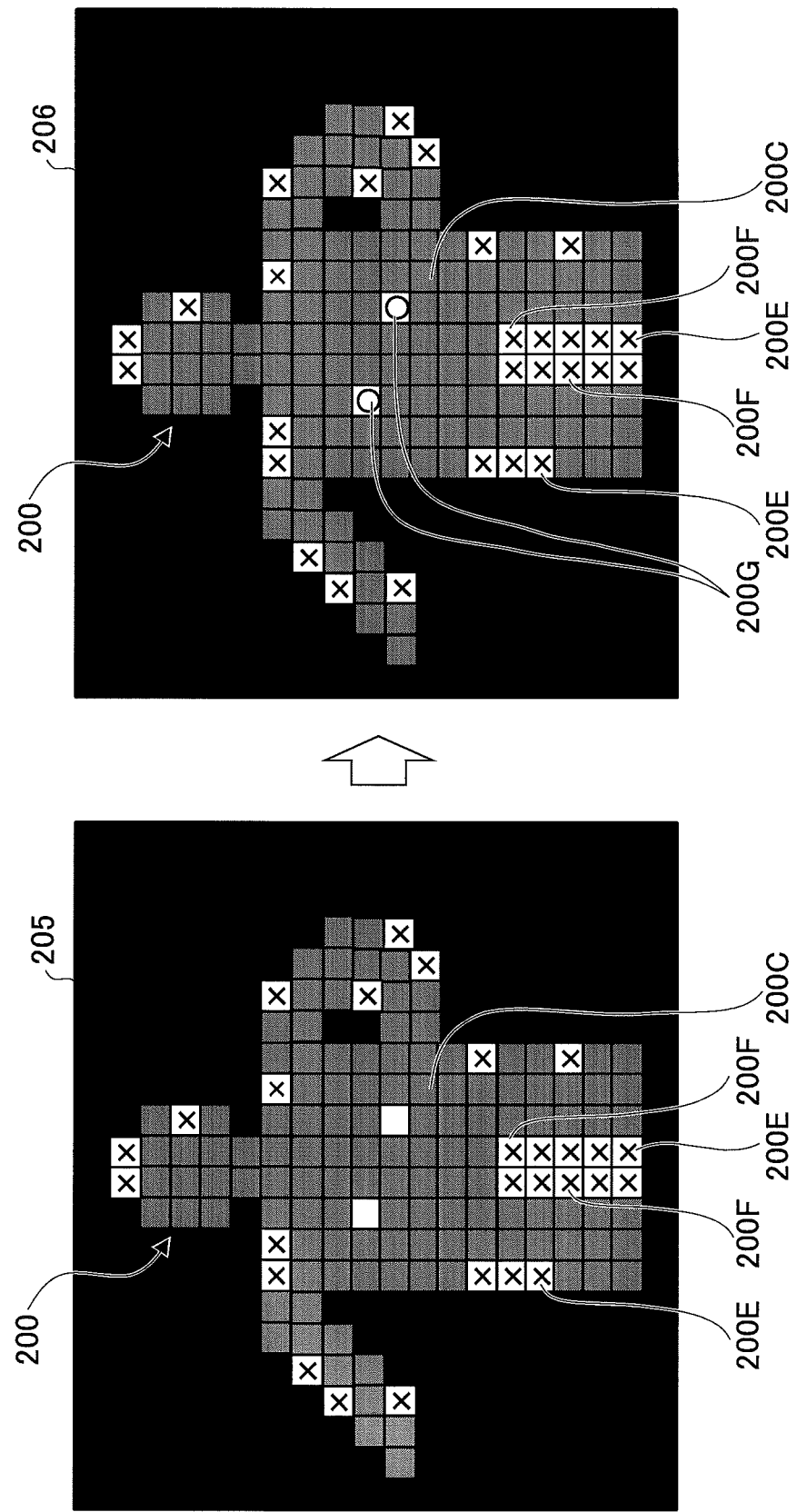
FIG. 19 is a diagram for explaining an example of a process of step S43.

FIG. 19 is a diagram for explaining an example of a process of step S43. From the difference binary image 205, the processor 41 excludes, in step S43, edge noise candidate points 200G other than the edge noise candidate points 200E and 200F judged in steps S41 and S42, from the points 200D forming the edge noise. In step S43, the processor 41 outputs a judgment result including a difference binary image 206 in which the edge noise candidate points 200E and 200F judged in steps S41 and S42 are judged as being the points 200D forming the edge noise. In the difference binary image 206, the edge noise candidate point 200G excluded from the point forming the edge noise is indicated by a symbol "o" in FIG. 19.

FIG. 20 is a diagram for explaining an example of the noise reduction process. The process may end after step S43. But instead, the noise reduction process of step S5 may be performed after step S43. In step S5, the processor 41 performs the noise reduction process to reduce the edge noise detected in step S43. More particularly, the processor 41 obtains a difference binary image 207 illustrated in FIG. 20 by eliminating the points 200D forming the edge noise from the difference binary image 206 generated in step S43, and outputs the result of the noise reduction process. In this case, the points 200D forming the edge noise (200D) that is eliminated, correspond to the edge noise candidate points excluding the edge noise candidate points 200G other than the edge noise candidate points 200E and 200F judged in steps S41 and S42. The result of the noise reduction process of step S5 may be displayed on the display device 44 illustrated in FIG. 2, for example, or may be output to an external apparatus (not illustrated), such as another computer or the like, via the interface 45 illustrated in FIG. 2, for example.

The points 200G indicated by the symbol "o" in FIG. 19 are the points detected as the edge noise due to the effects of the clothing or the accessories worn by the target 200 and having the relatively low reflectivity. The points 200G deteriorate the accuracy of the recognition process or the like that is subsequently performed using the difference binary image 206, when the point group density at the part of the target 200 decreases. For this reason, in order to prevent the points 200G from being detected as the edge noise or eliminated, this example replaces the points 200G by a point that does not form the edge noise or a point that is at the same distance as the target 200. On the other hand, the points 200E are located between the legs of the target 200 and are detected as the edge noise. If the points 200E between the legs of the target 200 were replaced by the point that is at the same distance as the target 200, the legs would appear as if the legs were connected in the range image. For this reason, this example judges the points 200E as being the edge noise or eliminates the points 200E as the edge noise.

In the distance measuring apparatus illustrated in FIG. 1, the computer 4 may form an example of a device or means that performs the processes of steps S41 to S43, to regard the points forming the edge noise 200D obtained by the processes of steps S1 to S4, as the edge noise candidate points, and amongst the edge noise candidate points, to judge the first points 200E in contact with the background, or the second points 200F in contact with the outer side of the contour line of the target 200, having the predetermined length or longer, as the points forming the edge noise, and to narrow down the edge noise 200D by excluding the points 200G other than the first and second points 200E and 200F.

The computer 4 may form an example of a device or means that performs a process to replace the excluded edge noise candidate point 200G by a point having the same distance value as the target 200. In addition, the computer 4 may form an example of a device or means that performs a noise reduction process to reduce or eliminate the edge noise 200D from the current range image 102.

Figure 21:
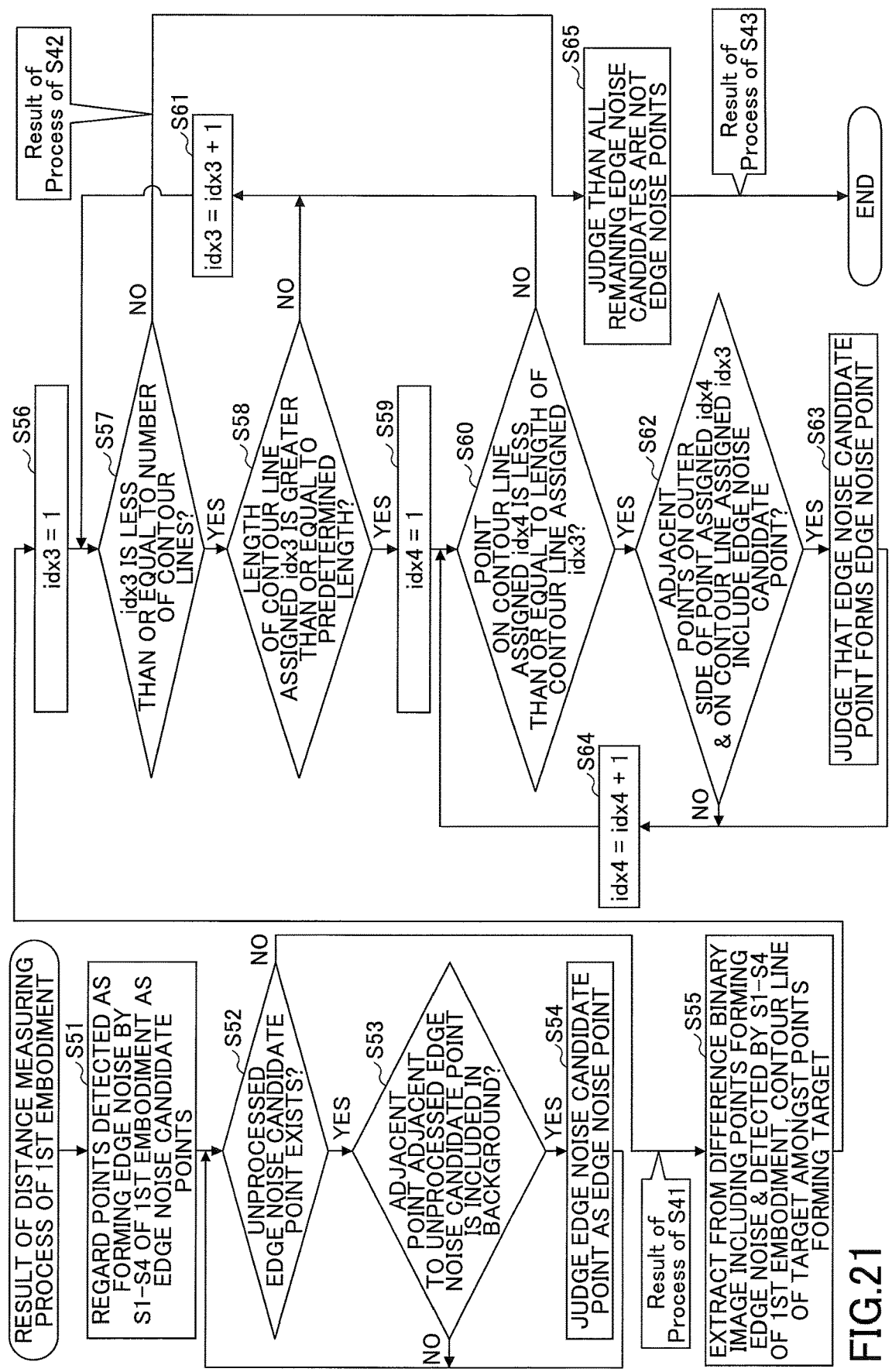
FIG. 21 is a flow chart for explaining, in more detail, the example of the distance measuring process in the second embodiment.

FIG. 21 is a flow chart for explaining, in more detail, the example of the distance measuring process in the second embodiment. For example, the processor 41 of the computer 4 illustrated in FIG. 2 may execute a program stored in the memory 42, to perform the distance measuring process illustrated in FIG. 21. In step S51 illustrated in FIG. 21, the processor 41 regards the points that are detected as forming the edge noise by steps S1 to S4 of the distance measuring process of the first embodiment described above, as the edge noise candidate points. In step S52, the processor 41 judges whether an unprocessed edge noise candidate point exists. The process advances to step S53 when the judgment result in step S52 is YES, and the process advances to step S55 which will be described later when the judgment result in step S52 is NO. In step S53, the processor 41 judges whether the adjacent point adjacent to the unprocessed edge noise candidate point is included in the background. The process advances to step S54 when the judgment result in step S53 is YES, and the process returns to step S52 when the judgment result in step S53 is NO. In step S54, the processor 41 judges the edge noise candidate point as being the edge noise point, and the process returns to step S52.

The result of the process in a case in which the judgment result in step S52 is NO corresponds to the result of the process of step S41 illustrated in FIG. 13, and the difference binary image 204 illustrated in FIG. 15 can be generated.

In step S55, the processor 41 extracts, from the difference binary image 203 that includes the points forming the edge noise and detected by the processes of steps S1 to S4 of the first embodiment, the contour line of the target 200 amongst the points 200C forming the target 200. In step S56, the processor 41 sets a number idx3 assigned to the contour line to idx3=1. In step S57, the processor 41 judges whether the number idx3 is less than or equal to the number of contour lines. The process advances to step S58 when the judgment result in step S57 is YES, and the process advances to step S64 which will be described later when the judgment result in step S57 is NO. In step S58, the processor 41 judges whether a length of the contour line assigned the number idx3 is greater than or equal to a predetermined length. The process advances to step S59 when the judgment result in step S58 is YES, and the process advances to step S61 which will be described later when the judgment result in step S58 is NO. In step S59, the processor 41 sets a number idx4 assigned to the point on the contour line to idx4=1.

In step S60, the processor 41 judges whether the point on the contour line, assigned the number idx4, is less than or equal to the length of the contour line assigned the number idx3. The process advances to step S62 when the judgment result in step S60 is YES, and the process advances to step S61 when the judgment result in step S60 is NO. In step S61, the processor 41 increments the number idx3 assigned to the contour line to idx3=idx3+1, and the process returns to step S57.

In step S62, the processor 41 judges whether the adjacent points on the outer side of the point that is assigned the number idx4 and is on the contour line that is assigned the number idx3 include an edge noise candidate point. The process advances to step S63 when the judgment result in step S62 is YES, and the process advances to step S64 when the judgment result in step S62 is NO. In step S63, the processor 41 judges that the edge noise candidate point judged in step S62 forms the edge noise, that is, is an edge noise point, and the process advances to step S64. In step S64, the processor 41 increments the number idx4 assigned to the contour line to idx4=idx4+1, and the process returns to step S60.

The result of the process in a case in which the judgment result in step S57 is NO corresponds to the result of the process of step S42 illustrated in FIG. 13, and the difference binary image 205 illustrated in FIG. 18 can be generated.

In step S65, the processor 41 judges that all remaining edge noise candidates are not edge noise points, and the process ends. The result of the process of step S65 corresponds to the result of the process of step S43 illustrated in FIG. 13, and the difference binary image 206 illustrated in FIG. 19 can be generated.

A noise reduction process similar to that of step S5 illustrated in FIG. 13 may be performed after step S65, to reduce the edge noise that is detected.

According to this embodiment, it is possible to detect the edge noise from the range image representing the distances to each of the range measurement points. In addition, the detected edge noise may be reduced or eliminated from the range image by performing the noise reduction process, to improve the accuracy of the range image. Further, amongst the edge noise candidate points, the point in contact with the background, or the point in contact with the outer side of the contour line of the target, having the predetermined length or longer, is judged as being the point forming the edge noise. Other points amongst the edge noise candidate points are excluded from the point forming the edge noise, to further improve the edge noise detection accuracy.

Therefore, according to each of the embodiments described above, it is possible to detect edge noise from a range image representing distances to each of range (or distance) measurement points.

Although the embodiments are numbered with, for example, "first," or "second," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A distance measuring apparatus comprising:
   a sensor configured to make a two-dimensional scan by launching a pulse laser beam and to measure a distance to a target based on reflected light received from the target;
   a memory configured to store a program; and
   a processor configured to execute the program and perform a process including
      generating a difference binary image from a first range image that is generated in a state in which the target does not exist with respect to a background and represents distances to each of a plurality of range measurement points on the first range image, and a second range image that is generated in a state in which the target exists with respect to the background and represents the distances to each of the plurality of range measurement points on the second range image;
      extracting a first region having a size that is greater than or equal to a first threshold value, from a non-background region of the difference binary image, made up of a plurality of non-background points;
      grouping adjacent points on the second range image into a plurality of groups of adjacent points having close distance values, for each of the points within the first region of the difference binary image, to extract second regions respectively corresponding to each of the plurality of groups of adjacent points having the close distance values, wherein the adjacent points having the close distance values refer to points having distance values with a difference that is less than or equal to a predetermined value; and
      extracting a third region having a size that is less than or equal to a second threshold value, from the second regions of the difference binary image, to output a judgment result which judges that each of a plurality of points within the third region is edge noise.

2. The distance measuring apparatus as claimed in claim 1, wherein the processor performs the process further including
   narrowing down the edge noise by regarding the plurality of points within the third region that are judged as the edge noise by the judgment result as a plurality of edge noise candidate points, and judging a first point in contact with the background, or a second point in contact with an outer side of a contour line of the target and having a predetermined length or longer, as being the point forming the edge noise, to narrow down the edge noise by excluding points other than the first or second point from the plurality of points forming the edge noise.

3. The distance measuring apparatus as claimed in claim 2, wherein the narrowing down includes
   judging the plurality of points within the third region that are judged as the edge noise by the judgment result as being the plurality of edge noise candidate points;
   judging, from amongst the plurality of edge noise candidate points, the first point in contact with the background, as being the point forming the edge noise;
   judging, from amongst the plurality of edge noise candidate points, the second point in contact with the outer side of the contour line of the target, having the predetermined length or longer, as being the point forming the edge noise; and
   narrowing down the edge noise by excluding the points other than the first and second points from the plurality of points forming the edge noise.

4. The distance measuring apparatus as claimed in claim 2, wherein the processor performs the process further including
   replacing the points excluded from the plurality of points forming the edge noise by the narrowing down by points having distance values identical to those of the target.

5. The distance measuring apparatus as claimed in claim 1, wherein the processor performs the process further including
   performing a noise reduction process to reduce or eliminate the edge noise from the second range image.

6. The distance measuring apparatus as claimed in claim 1, wherein one point at a two-dimensional coordinate within the first and second range images corresponds to one or a plurality of pixels of the first and second range images.

7. The distance measuring apparatus as claimed in claim 1, wherein the processor performs the process further including
   generating a range image representing the distances to the plurality of range measurement points by pixels having colors according to the distances.

8. A distance measuring method comprising:
controlling, by a computer, a sensor to make a two-dimensional scan by launching a pulse laser beam and measure a distance to a target based on reflected light received from the target;
generating, by the computer, a difference binary image from a first range image that is generated in a state in which the target does not exist with respect to a background and represents distances to each of a plurality of range measurement points on the first range image, and a second range image that is generated in a state in which the target exists with respect to the background and represents the distances to each of the plurality of range measurement points on the second range image;
extracting, by the computer, a first region having a size that is greater than or equal to a first threshold value, from a non-background region of the difference binary image, made up of a plurality of non-background points;
grouping, by the computer, adjacent points on the second range image into a plurality of groups of adjacent points having close distance values, for each of the points within the first region of the difference binary image, to extract second regions respectively corresponding to each of the plurality of groups of adjacent points having the close distance values, wherein the adjacent points having the close distance values refer to points having distance values with a difference that is less than or equal to a predetermined value; and
extracting, by the computer, a third region having a size that is less than or equal to a second threshold value, from the second regions of the difference binary image, to output a judgment result which judges that each of a plurality of points within the third region is edge noise.

9. The distance measuring method as claimed in claim 8, further comprising:
narrowing down, by the computer, the edge noise by regarding the plurality of points within the third region that are judged as the edge noise by the judgment result as a plurality of edge noise candidate points, and judging a first point in contact with the background, or a second point in contact with an outer side of a contour line of the target and having a predetermined length or longer, as being the point forming the edge noise, to narrow down the edge noise by excluding points other than the first or second point from the plurality of points forming the edge noise.

10. The distance measuring method as claimed in claim 9, wherein the narrowing down includes
judging the plurality of points within the third region that are judged as the edge noise by the judgment result as being the plurality of edge noise candidate points;
judging, from amongst the plurality of edge noise candidate points, the first point in contact with the background, as being the point forming the edge noise;
judging, from amongst the plurality of edge noise candidate points, the second point in contact with the outer side of the contour line of the target, having the predetermined length or longer, as being the point forming the edge noise; and
narrowing down the edge noise by excluding the points other than the first and second points from the plurality of points forming the edge noise.

11. The distance measuring method as claimed in claim 9, further comprising:
replacing, by the computer, the points excluded from the plurality of points forming the edge noise by the narrowing down by points having distance values identical to those of the target.

12. The distance measuring method as claimed in claim 8, further comprising:
performing, by the computer, a noise reduction process to reduce or eliminate the edge noise from the second range image.

13. The distance measuring method as claimed in claim 8, wherein one point at a two-dimensional coordinate within the first and second range images corresponds to one or a plurality of pixels of the first and second range images.

14. A non-transitory computer-readable storage medium having stored therein a program for causing a computer to perform a process comprising:
controlling a sensor to make a two-dimensional scan by launching a pulse laser beam and measure a distance to a target based on reflected light received from the target;
generating a difference binary image from a first range image that is generated in a state in which the target does not exist with respect to a background and represents distances to each of a plurality of range measurement points on the first ramie image, and a second range image that is generated in a state in which the target exists with respect to the background and represents the distances to each of the plurality of range measurement points on the second range image;
extracting a first region having a size that is greater than or equal to a first threshold value, from a non-background region of the difference binary image, made up of a plurality of non-background points;
grouping adjacent points on the second range image into a plurality of groups of adjacent points having close distance values, for each of the points within the first region of the difference binary image, to extract second regions respectively corresponding to each of the plurality of groups of adjacent points having the close distance values, wherein the adjacent points having the close distance values refer to points having distance values with a difference that is less than or equal to a predetermined value; and
extracting a third region having a size that is less than or equal to a second threshold value, from the second regions of the difference binary image, to output a judgment result which judges that each of a plurality of points within the third region is edge noise.

15. The non-transitory computer-readable storage medium as claimed in claim 14, wherein the process further comprises:
narrowing down the edge noise by regarding the plurality of points within the third region that are judged as the edge noise by the judgment result as a plurality of edge noise candidate points, and judging a first point in contact with the background, or a second point in contact with an outer side of a contour line of the target and having a predetermined length or longer, as being the point forming the edge noise, to narrow down the edge noise by excluding points other than the first or second point from the plurality of points forming the edge noise.

16. The non-transitory computer-readable storage medium as claimed in claim 15, wherein the narrowing down includes judging the plurality of points within the third region that are judged as the edge noise by the judgment result as being the plurality of edge noise candidate points;

judging, from amongst the plurality of edge noise candidate points, the first point in contact with the background, as being the point forming the edge noise;

judging, from amongst the plurality of edge noise candidate points, the second point in contact with the outer side of the contour line of the target, having the predetermined length or longer, as being the point forming the edge noise; and narrowing down the edge noise by excluding the points other than the first and second points from the plurality of points forming the edge noise.

17. The non-transitory computer-readable storage medium as claimed in claim 15, wherein the process further comprises:

replacing the points excluded from the plurality of points forming the edge noise by the narrowing down by points having distance values identical to those of the target.

18. The non-transitory computer-readable storage medium as claimed in claim 14, wherein the process further comprises:

performing a noise reduction process to reduce or eliminate the edge noise from the second range image.

19. The non-transitory computer-readable storage medium as claimed in claim 14, wherein one point at a two-dimensional coordinate within the first and second range images corresponds to one or a plurality of pixels of the first and second range images.

20. The non-transitory computer-readable storage medium as claimed in claim 14, wherein the process further comprises:

generating a range image representing the distances to the plurality of range measurement points by pixels having colors according to the distances.

* * * * *